United States Patent
Choi et al.

(10) Patent No.: US 12,382,518 B2
(45) Date of Patent: Aug. 5, 2025

(54) ELECTRONIC DEVICE FOR PERFORMING SCAN IN WIRELESS LAN SYSTEM AND METHOD FOR OPERATING SAME

(71) Applicant: SAMSUNG ELECTRONICS CO., LTD., Suwon-si (KR)

(72) Inventors: Junsu Choi, Suwon-si (KR); Kyuhyuck Kwak, Suwon-si (KR); Taeyong Kim, Suwon-si (KR); Hyunkee Min, Suwon-si (KR); Junghun Lee, Suwon-si (KR); Junyeop Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 363 days.

(21) Appl. No.: 17/947,649

(22) Filed: Sep. 19, 2022

(65) Prior Publication Data

US 2023/0084624 A1    Mar. 16, 2023

Related U.S. Application Data

(63) Continuation of application No. PCT/KR2022/013016, filed on Aug. 31, 2022.

(30) Foreign Application Priority Data

Sep. 10, 2021 (KR) .......... 10-2021-0121008

(51) Int. Cl.
*H04W 76/10* (2018.01)
*H04W 8/00* (2009.01)
(Continued)

(52) U.S. Cl.
CPC .......... *H04W 76/10* (2018.02); *H04W 8/005* (2013.01); *H04W 76/30* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 6,711,122 B1 * | 3/2004 | Langley | ............... H04L 1/1685 370/205 |
| 9,241,300 B2 | 1/2016 | Jalloul et al. | |

(Continued)

FOREIGN PATENT DOCUMENTS

| | | |
|---|---|---|
| KR | 10-2011-0060976 | 6/2011 |
| KR | 10-2015-0121042 | 10/2015 |
| KR | 10-2018-0022694 | 3/2018 |

OTHER PUBLICATIONS

Search Report dated Dec. 7, 2022 in International Patent Application No. PCT/KR2022/013016.
(Continued)

*Primary Examiner* — Hassan A Phillips
*Assistant Examiner* — Gautam Sharma
(74) *Attorney, Agent, or Firm* — Nixon & Vanderhye, P.C.

(57) ABSTRACT

An example electronic device may include at least one first antenna supporting a first frequency band and a second frequency band of a wireless LAN communication method, a first communication circuit supporting a first subband and a second subband of the first frequency band, a second communication circuit supporting the second subband of the first frequency band and the second frequency band A processor may identify an operating mode of at least one of the first communication circuit or the second communication circuit, release an electrical connection of at least one of the first communication circuit or the second communication circuit operating in a scan mode with the at least one first antenna in a case in which at least one of the first communication circuit or the second communication circuit oper-
(Continued)

ates in the scan mode, and electrically connect the at least one first antenna to at least one of the first communication circuit or the second communication circuit operating in a communication mode in a case in which the first communication circuit or the second communication circuit operates in the communication mode.

20 Claims, 10 Drawing Sheets

(51) Int. Cl.
*H04W 76/30* (2018.01)
*H04W 84/12* (2009.01)

(56) References Cited

U.S. PATENT DOCUMENTS

| | | | |
|---|---|---|---|
| 9,307,484 B2 | 4/2016 | Lee et al. | |
| 10,447,332 B2 | 10/2019 | Homchaudhuri et al. | |
| 2010/0316027 A1 | 12/2010 | Rick et al. | |
| 2011/0128877 A1 | 6/2011 | Dong et al. | |
| 2011/0249603 A1* | 10/2011 | Rick | H04B 1/006 370/311 |
| 2011/0250926 A1 | 10/2011 | Wietfeldt et al. | |
| 2013/0029639 A1* | 1/2013 | Lee | H04W 76/12 455/411 |
| 2014/0233444 A1 | 8/2014 | Wang et al. | |
| 2015/0036656 A1* | 2/2015 | McCarthy | H04B 7/0689 370/331 |
| 2016/0028152 A1* | 1/2016 | Anguera Pros | H01Q 1/38 |
| 2016/0380665 A1 | 12/2016 | Lee et al. | |
| 2017/0164289 A1* | 6/2017 | Mofidi | H04W 4/80 |
| 2017/0317709 A1 | 11/2017 | Prendergast et al. | |
| 2021/0006275 A1* | 1/2021 | Langer | H04B 7/0413 |
| 2023/0156615 A1* | 5/2023 | Roman | H04W 52/367 455/522 |
| 2023/0411828 A1* | 12/2023 | Peng | H01Q 5/371 |

OTHER PUBLICATIONS

Written Opinion dated Dec. 7, 2022 in International Patent Application No. PCT/KR2022/013016.

* cited by examiner

ELECTRONIC DEVICE FOR PERFORMING SCAN IN WIRELESS LAN SYSTEM AND METHOD FOR OPERATING SAME

CROSS-REFERENCE TO RELATED APPLICATIONS

This application is a continuation of International Application No. PCT/KR2022/013016 designating the United States, filed on Aug. 31, 2022, in the Korean Intellectual Property Receiving Office and claiming priority to Korean Patent Application No. 10-2021-0121008, filed on Sep. 10, 2021, in the Korean Intellectual Property Office, the disclosures of which are incorporated by reference herein in their entireties.

BACKGROUND

Field

Various embodiments of the disclosure relate to an apparatus and a method for performing a scan in an electronic device of a WLAN system.

Description of Related Art

A wireless local area network (WLAN) system may use a designated frequency band (for example, about 2.4 GHz band and/or about 5 GHz band) so as to support wireless connection of various electronic devices such as a smartphone, a tablet personal computer (PC), or a notebook.

A WLAN system may be installed not only in a private space such as a house, but also in a public space such as an airport, a train station, an office, or department store.

SUMMARY

When a WLAN system has external electronic devices (for example, transmission nodes or access points (AP)) installed densely, the influence of interference may increase the latency for transmitting and/or receiving data, or may decrease the transmission rate.

The WLAN system may increase available frequency resources to reduce the influence of interference between external electronic devices. For example, a WLAN system (for example, Wi-Fi 6 standard) may use, in addition to a first frequency band (for example, about 2.4 GHz band and/or about 5 GHz band), a second frequency band (for example, about 6 GHz) as an available frequency resource.

As available frequency resources increase, an electronic device of the WLAN system may have a relatively increased number of channels to be scanned to find an external electronic device to access, and the scan time to find external electronic devices may thus increase. As a result, the electronic device of the WLAN system may have an increased time necessary for initial connection and/or roaming.

Various embodiments of the disclosure provide an apparatus and a method for performing a scan in an electronic device of a WLAN system.

According to various embodiments, an electronic device may include at least one first antenna supporting a first frequency band and a second frequency band of a wireless LAN communication method, a first communication circuit supporting a first subband and a second subband of the first frequency band, a second communication circuit supporting the second subband of the first frequency band and the second frequency band, and a processor operatively connected to the first communication circuit and the second communication circuit, wherein the processor is configured to identify an operating mode of at least one of the first communication circuit or the second communication circuit, release an electrical connection of at least one of the first communication circuit or the second communication circuit operating in a scan mode with the at least one first antenna in a case in which at least one of the first communication circuit or the second communication circuit operates in the scan mode, and electrically connect the at least one first antenna to at least one of the first communication circuit or the second communication circuit operating in a communication mode in a case in which at least one of the first communication circuit or the second communication circuit operates in the communication mode.

According to various embodiments, a method of operating an electronic device including at least one first antenna supporting a first frequency band and a second frequency band of a wireless LAN communication method, a first communication circuit supporting a first subband of the first frequency band and a second subband, and a second communication circuit supporting the second subband of the first frequency band and the second frequency band may include identifying an operating mode of at least one of the first communication circuit or the second communication circuit, releasing an electrical connection of at least one of the first communication circuit operating in a scan mode with the at least one first antenna or the second communication circuit in a case in which at least one of the first communication circuit or the second communication circuit operates in the scan mode, and electrically connecting the at least one first antenna to at least one of the first communication circuit or the second communication circuit operating in a communication mode in a case in which at least one of the first communication circuit or the second communication circuit operates in the communication mode.

According to various embodiments, an electronic device may include at least one first antenna supporting a first frequency band and a second frequency band of a wireless LAN communication method, a first communication circuit supporting a first subband of the first frequency band and a second subband, a second communication circuit supporting the second subband of the first frequency band and the second frequency band, and a processor operatively connected to the first communication circuit and the second communication circuit, wherein the processor is configured to identify an operating mode of at least one of the first communication circuit or the second communication circuit, release an electrical connection of at least one of the first communication circuit operating in a scan mode with the at least one first antenna or the second communication circuit in a case in which at least one of the first communication circuit or the second communication circuit operates in the scan mode related to at least one of the second subband of the first frequency band or the second frequency band, and maintain an electrical connection between the at least one first antenna and the first communication circuit in a case in which the first communication circuit operates in a scan mode related to the first subband of the first frequency band.

According to various embodiments of the disclosure, in an electronic device of a WLAN system, electric connection of communication circuits for transmitting and/or receiving data with at least one antenna supporting an available frequency resource (for example, about 2.4 GHz band, about 5 GHz, and/or about 6 GHz band) is controlled, based on the operating mode (for example, scan mode and/or communication mode) of the electronic device, such that the electronic device can efficiently perform scan operations.

DETAILED DESCRIPTION

Hereinafter, various embodiments will be described in detail with reference to attached drawings.

Figure 1:
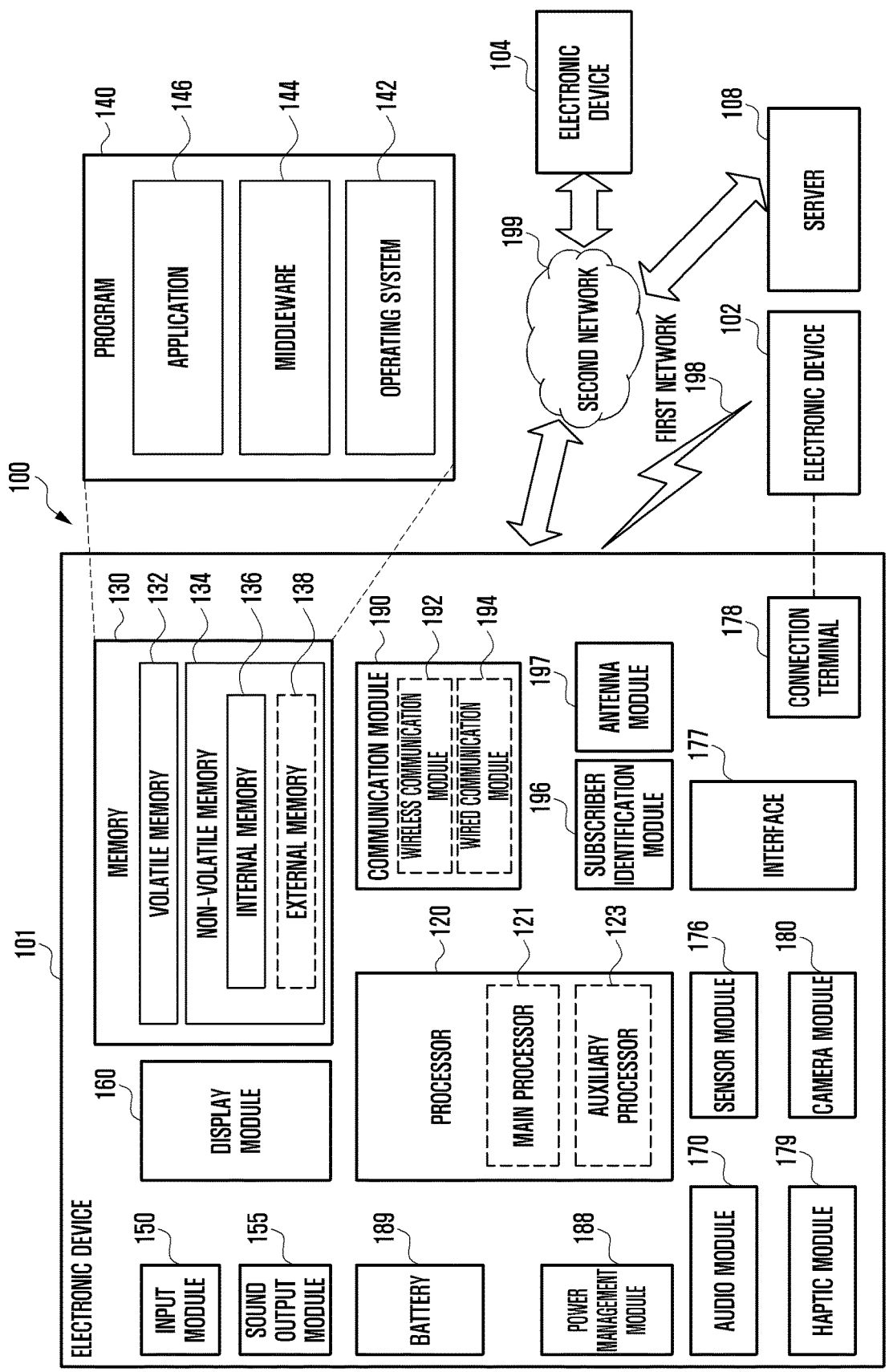
FIG. 1 is a block diagram of an example electronic device in a network environment according to various embodiments.

FIG. 1 is a block diagram illustrating an electronic device 101 in a network environment 100 according to various embodiments. Referring to FIG. 1 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
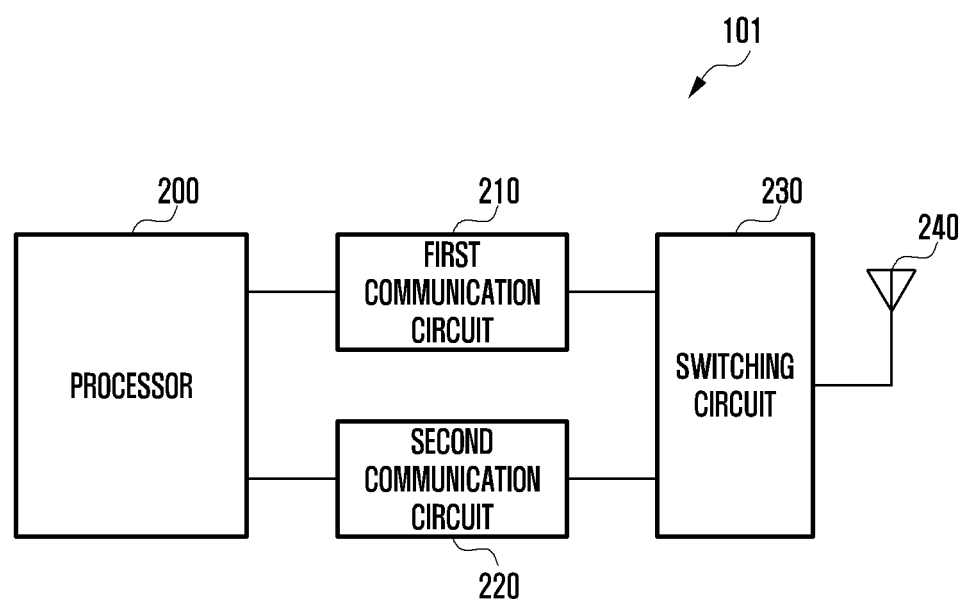
FIG. 2 is a block diagram of an example electronic device for controlling a connection between an antenna and a communication circuit according to various embodiments.

FIG. 2 is a block diagram of an example electronic device for controlling a connection between an antenna and a communication circuit according to various embodiments.

According to an embodiment, an electronic device 101 of FIG. 2 may be at least partially similar to the electronic device 101 of FIG. 1 or may include various embodiments of the electronic device.

According to various embodiments with reference to FIG. 2, the electronic device 101 may include a processor 200, a first communication circuit 210 (or first communication circuitry), a second communication circuit 220 (or second communication circuitry), a switching circuit 230 (or switching circuitry), and/or a first antenna 240. According to an embodiment, the processor 200 may be substantially the same as the processor 120 of FIG. 1 or may be included in the processor 120. For example and without limitation, the processor 200 may be configured as a logical module in the processor 120 of FIG. 1. According to an embodiment, the processor 200 may be configured as hardware separate from the processor 120 of FIG. 1. According to an embodiment, the first communication circuit 210 and/or the second communication circuit 220 may be substantially the same as the wireless communication module 192 of FIG. 1, or may be included in the wireless communication module 192. The first antenna 240 may be substantially the same as the antenna module 197 of FIG. 1 or may be included in the antenna module 197. According to an embodiment, the processor 200 may be operatively connected to the first communication circuit 210, the second communication circuit 220, and/or the switching circuit 230.

According to various embodiments, the first communication circuit 210 and the second communication circuit 220 may transmit and/or receive signals and/or data to and from an external electronic device through a wireless local area network (WLAN). According to an embodiment, the first communication circuit 210 and the second communication circuit 220 may be configured with software for processing signals and protocols of different frequency bands. For example, the first communication circuit 210 and the second communication circuit 220 may be logically (e.g., software) divided. According to an embodiment, the first communication circuit 210 and the second communication circuit 220 may be configured with different circuits or different hardware. For example, wireless LAN communication is short-range wireless communication, and may be referred to as wireless fidelity (Wi-Fi). For example, the external electronic device may serve as a base station that provides wireless communication to the electronic device 101 located within a communication radius of wireless LAN communication. As an example, the external electronic device may include a transmission node and/or an access point (AP).

According to an embodiment, the first communication circuit 210 may transmit and/or receive signals and/or data to and from external electronic devices through a first frequency band (e.g., about 2.4 GHz band and/or about 5 GHz band) of wireless LAN communication. For example, the first communication circuit 210 may include a radio frequency integrated circuit (RFIC) and/or a radio frequency front end (RFFE) for communication with an external electronic device through a first frequency band of wireless LAN communication. For example, the first frequency band for wireless LAN communication may include a frequency band of about 2.4 GHz to about 2.5 GHz that is a first subband (e.g., about 2.4 GHz band) and a frequency band of about 5 GHz to about 5.9 GHz that is a second subband (e.g., about 5 GHz band).

According to an embodiment, the second communication circuit 220 may transmit and/or receive signals and/or data to and from external electronic devices through a partial band of the first frequency band (e.g., about 5 GHz band)

and second frequency band (e.g., about 6 GHz band) of wireless LAN communication. For example, the second communication circuit 220 may include an RFIC and/or an RFFE for communication with an external electronic device through a partial band of the first frequency band and the second frequency band of wireless LAN communication. For example, a partial band of the first frequency band for wireless LAN communication may include a frequency band (e.g., about 5 GHz band) of about 5 GHz to about 5.9 GHz, which is the second subband of the first frequency band. For example, the second frequency band for wireless LAN communication may include a frequency band of about 5.9 GHz to about 7.2 GHz (e.g., about 6 GHz band).

According to an embodiment, the first communication circuit 210 and the second communication circuit 220 may transmit and/or receive signals and/or data to and from at least one external electronic device through the first antenna 240 supporting the first frequency band and the second frequency band for wireless LAN communication. For example, the first antenna 240 may include at least one antenna supporting the first frequency band and the second frequency band.

According to an embodiment, the processor 200 may control the switching circuit 230 to electrically connect the first communication circuit 210 and/or the second communication circuit 220 to the first antenna 240 based on the operation mode of the first communication circuit 210 and/or the second communication circuit 220. For example, the operation mode of the first communication circuit 210 and/or the second communication circuit 220 may include a scan mode and/or a communication mode.

According to an embodiment, the processor 200 may control the switching circuit 230 to release the electrical connection between the first antenna 240 and at least one of the first communication circuit 210 or the second communication circuit 220 operating in the scan mode. For example, the first communication circuit 210 and/or the second communication circuit 220 operating in the scan mode may perform scanning on a designated frequency band by using a separate antenna (not illustrated) different from the first antenna 240. For example, the processor 200 may identify whether the first communication circuit 210 and/or the second communication circuit 220 operates (or switches) in the scan mode based on information related to the operation mode provided from the first communication circuit 210 and/or the second communication circuit 220. For example, the processor 200 may identify whether the first communication circuit 210 and/or the second communication circuit 220 operates (or switches) in the scan mode based on information related to a specified scan cycle. For example, the scan mode may include a series of operations of searching for an external electronic device connectable to the electronic device 101 through at least one channel included in an available frequency band of the electronic device 101.

According to an embodiment, the processor 200 may control the switching circuit 230 to electrically connect at least one of the first communication circuit 210 or the second communication circuit 220 operating in the communication mode to the first antenna 240. For example, the first communication circuit 210 and/or the second communication circuit 220 operating in the communication mode may transmit and/or receive signals and/or data to and from at least one external electronic device by using the first antenna 240 and/or a separate antenna (not illustrated). For example, the processor 200 may identify whether the first communication circuit 210 and/or the second communication circuit 220 operates (or switches) in the communication mode based on information related to the operation mode provided from the first communication circuit 210 and/or the second communication circuit 220. For example, the processor 200 may identify whether the first communication circuit 210 and/or the second communication circuit 220 operates (or switches) in the communication mode based on information related to a designated scan execution period. For example, the scan execution period may include a time period defined for the electronic device 101 to perform scanning. For example, the communication mode may include a series of operations for transmitting and/or receiving data through an external electronic device to which the electronic device 101 is connected.

According to various embodiments, the switching circuit 230 may electrically connect the first communication circuit 210 and/or the second communication circuit 220 to the first antenna 240. For example, the switching circuit 230 may include at least one switch for electrical connection between the first communication circuit 210 and/or the second communication circuit 220 and the first antenna 240.

According to an embodiment, the switching circuit 230 may release the electrical connection between at least one of the first communication circuit 210 or the second communication circuit 220 operating in the scan mode and the first antenna 240 based on the control of the processor 200. For example, in a case in which the first communication circuit 210 operates in the scan mode, the switching circuit 230 may release the electrical connection between the first communication circuit 210 and the first antenna 240. For example, in a case in which the second communication circuit 220 operates in the scan mode, the switching circuit 230 may release the electrical connection between the second communication circuit 220 and the first antenna 240.

According to an embodiment, the switching circuit 230 may electrically connect at least one of the first communication circuit 210 or the second communication circuit 220 operating in the communication mode to the first antenna 240 based on the control of the processor 200. For example, in a case in which the first communication circuit 210 operates in the communication mode, the switching circuit 230 may electrically connect the first communication circuit 210 to the first antenna 240. For example, in a case in which the second communication circuit 220 operates in the communication mode, the switching circuit 230 may electrically connect the second communication circuit 220 to the first antenna 240.

According to various embodiments, in a case in which the first communication circuit 210 and/or the second communication circuit 220 operates in the scan mode, the electronic device 101 may reduce the influence of interference by a scan-related signal to other communication circuits (e.g., the second communication circuit 220 or the first communication circuit 210) by controlling the switching circuit 230. For example and without limitation, the scan-related signal may include a beacon signal, a probe request signal, a probe response signal, and/or a fast initial link setup (FILS) discovery signal.

Figure 3:
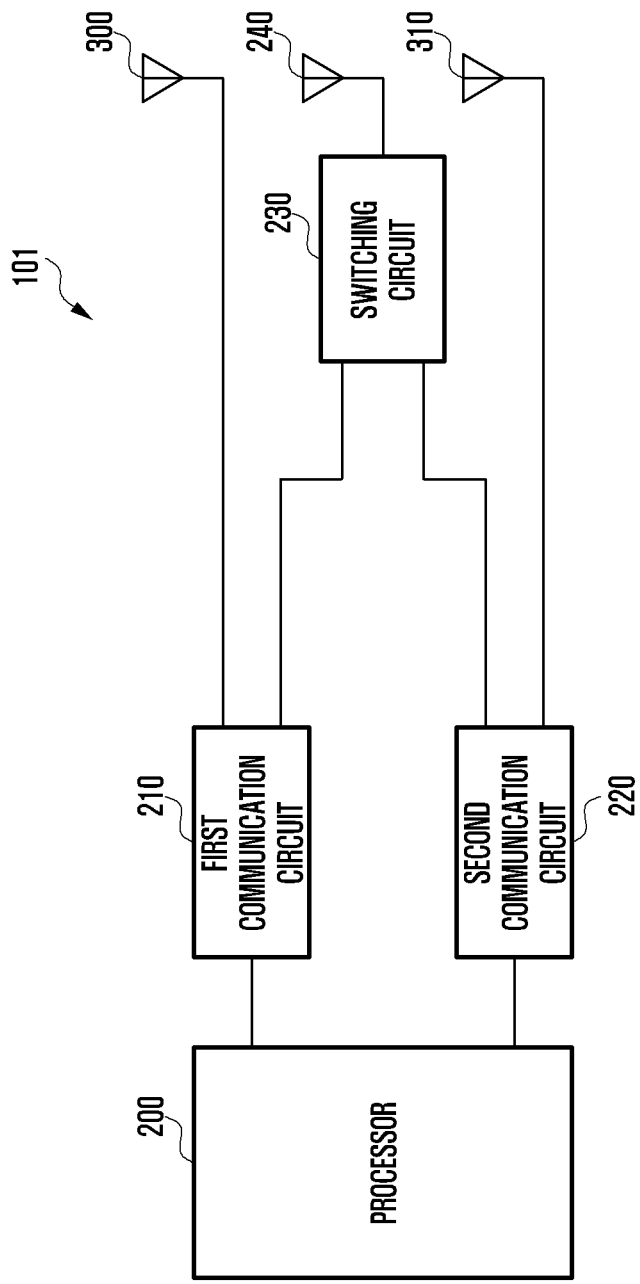
FIG. 3 is a block diagram of an example electronic device for controlling a connection between an antenna and a communication circuit based on an operation mode of an electronic device according to various embodiments.

FIG. 3 is a block diagram of an example electronic device for controlling a connection between an antenna and a communication circuit based on an operation mode of an electronic device according to various embodiments.

According to various embodiments with reference to FIG. 3, the electronic device 101 may include a processor 200, a first communication circuit 210, a second communication circuit 220, a switching circuit 230, a first antenna 240, a second antenna 300, and/or a third antenna 310. According to an embodiment, the first antenna 240, the second antenna 300, and/or the third antenna 310 may be substantially the same as the antenna module 197 of FIG. 1 or may be included in the antenna module 197. According to an embodiment, because the processor 200, the first communication circuit 210, the second communication circuit 220, and the switching circuit 230 of FIG. 3 are configured the same as the processor 200, the first communication circuit 210, the second communication circuit 220, and the switching circuit 230 of FIG. 2, a detailed description thereof will not be repeated here.

According to various embodiments, the switching circuit 230 may electrically connect the first communication circuit 210 and/or the second communication circuit 220 to the first antenna 240. According to an embodiment, the switching circuit 230 may release the electrical connection between the first antenna 240 and the first communication circuit 210 and/or the second communication circuit 220 operating in the scan mode. For example, in a case in which the first communication circuit 210 operates in the scan mode, the switching circuit 230 may release the electrical connection between the first communication circuit 210 and the first antenna 240. In a case in which the second communication circuit 220 operates in the scan mode, the switching circuit 230 may release the electrical connection between the second communication circuit 220 and the first antenna 240.

According to an embodiment, the switching circuit 230 may electrically connect the first communication circuit 210 and/or the second communication circuit 220 operating in the communication mode to the first antenna 240. According to an embodiment, the switching circuit 230 may release the electrical connection between the first communication circuit 210 operating in the scan mode and the first antenna 240, and may electrically connect the second communication circuit 220 operating in the communication mode to the first antenna 240. For example, in a case in which the first communication circuit 210 operates in the communication mode, the switching circuit 230 may electrically connect the first communication circuit 210 to the first antenna 240. In a case in which the second communication circuit 220 operates in the communication mode, the switching circuit 230 may electrically connect the second communication circuit 220 to the first antenna 240.

According to various embodiments, the first communication circuit 210 may transmit and/or receive signals and/or data to and from an external electronic device (e.g., a transmission node and/or an access point (AP)) through the electrically connected first antenna 240 and/or the second antenna 300.

According to an embodiment, in a case in which the first communication circuit 210 operates in the scan mode, the first communication circuit 210 may scan at least one channel corresponding to the first frequency band through the second antenna 300 supporting the first frequency band for wireless LAN communication. For example, the first communication circuit 210 may operate (or switch) in the scan mode based on the execution of a wireless LAN setting menu, transition of the first communication circuit 210 from an inactive state to an active state, disconnection of wireless LAN communication with an external electronic device, and/or characteristics of an application program running in the electronic device 101. For example, in a case in which the first communication circuit 210 operates in the scan mode, the first communication circuit 210 may receive a signal (e.g., a beacon signal) periodically transmitted from the external electronic device through the second antenna 300, and search for an external electronic device that the electronic device 101 may access through the first frequency band. For example, in a case in which the first communication circuit 210 operates in the scan mode, the first communication circuit 210 may transmit a probe request signal through at least one channel included in the first frequency band through the second antenna 300. The first communication circuit 210 may receive a probe response signal corresponding to the probe request signal transmitted through at least one channel through the second antenna 300, and search for an external electronic device that the electronic device 101 may access through the first frequency band. For example, the first communication circuit 210 may transmit the probe request signal through at least one channel (e.g., a preferred scanning channel (PSC)) spaced apart by a specified interval (e.g., about 4 channels) among channels included in the first frequency band.

According to an embodiment, in a case in which the first communication circuit 210 operates in the communication mode, the first communication circuit 210 may transmit and/or receive data to and from an external electronic device through the first antenna 240 and/or the second antenna 300. For example, the first communication circuit 210 may transmit and/or receive data to and from an external electronic device through multiple streams using the first antenna 240 and/or the second antenna 300.

According to various embodiments, the second communication circuit 220 may transmit and/or receive signals and/or data to and from an external electronic device (e.g., a transmission node and/or an AP) through the electrically connected first antenna 240 and/or the third antenna 310.

According to an embodiment, in a case in which the second communication circuit 220 operates in the scan mode, the second communication circuit 220 may scan at least one channel corresponding to a partial band (e.g., the second subband) of the first frequency band and/or the second frequency band through the third antenna 310 supporting a partial band (e.g., the second subband) of the first frequency band and the second frequency band for wireless LAN communication. For example, the second communication circuit 220 may operate (or switch) in the scan mode based on the execution of a wireless LAN setting menu, transition of the second communication circuit 220 from an inactive state to an active state, disconnection of wireless LAN communication with an external electronic device, and/or characteristics of an application program running in the electronic device 101. For example, in a case in which the second communication circuit 220 operates in the scan mode, the second communication circuit 220 may receive a signal (e.g., a beacon signal) periodically transmitted from the external electronic device through the third antenna 310, and search for an external electronic device that the electronic device 101 may access through a partial band (e.g., the second subband) of the first frequency band and/or the second frequency band. For example, in a case in which the second communication circuit 220 operates in the scan mode, the second communication circuit 220 may transmit a probe request signal through at least one channel included in a partial band (e.g., the second subband) of the first frequency band and/or the second frequency band through the third antenna 310. The second communication circuit 220 may receive a probe response signal corresponding to the probe request signal transmitted through at least one channel through the third antenna 310, and search for an external electronic device that the electronic device 101 may access through a partial band (e.g., the second subband) of the first frequency band and/or the second frequency band. For example, the second communication circuit 220 may transmit the probe request signal through at least one channel (e.g., a PSC) spaced apart by a specified interval (e.g., about 4 channels) among channels included in a partial band (e.g., the second subband) of the first frequency band and/or the second frequency band.

According to an embodiment, in a case in which the second communication circuit 220 operates in the communication mode, the second communication circuit 220 may transmit and/or receive data to and from an external electronic device through the first antenna 240 and/or the third antenna 310. For example, the second communication circuit 220 may transmit and/or receive data to and from an external electronic device through multiple streams using the first antenna 240 and/or the third antenna 310.

According to various embodiments, the electronic device 101 may release the electrical connection between the first antenna 240 and the first communication circuit 210 and/or the second communication circuit 220 operating in the scan mode. In this case, the first communication circuit 210 and the second communication circuit 220 may independently perform scans related to different frequency bands within the same time period. For example, the first communication circuit 210 may scan the first frequency band or the first subband (e.g., about 2.4 GHz band) of the first frequency band through the second antenna 300 for a specified time period. The second communication circuit 220 may scan the second subband (e.g., about 5 GHz band) of the second frequency band (e.g., about 6 GHz band) or the first frequency band, and the second frequency band through the third antenna 310 for a specified time period.

Figure 4:
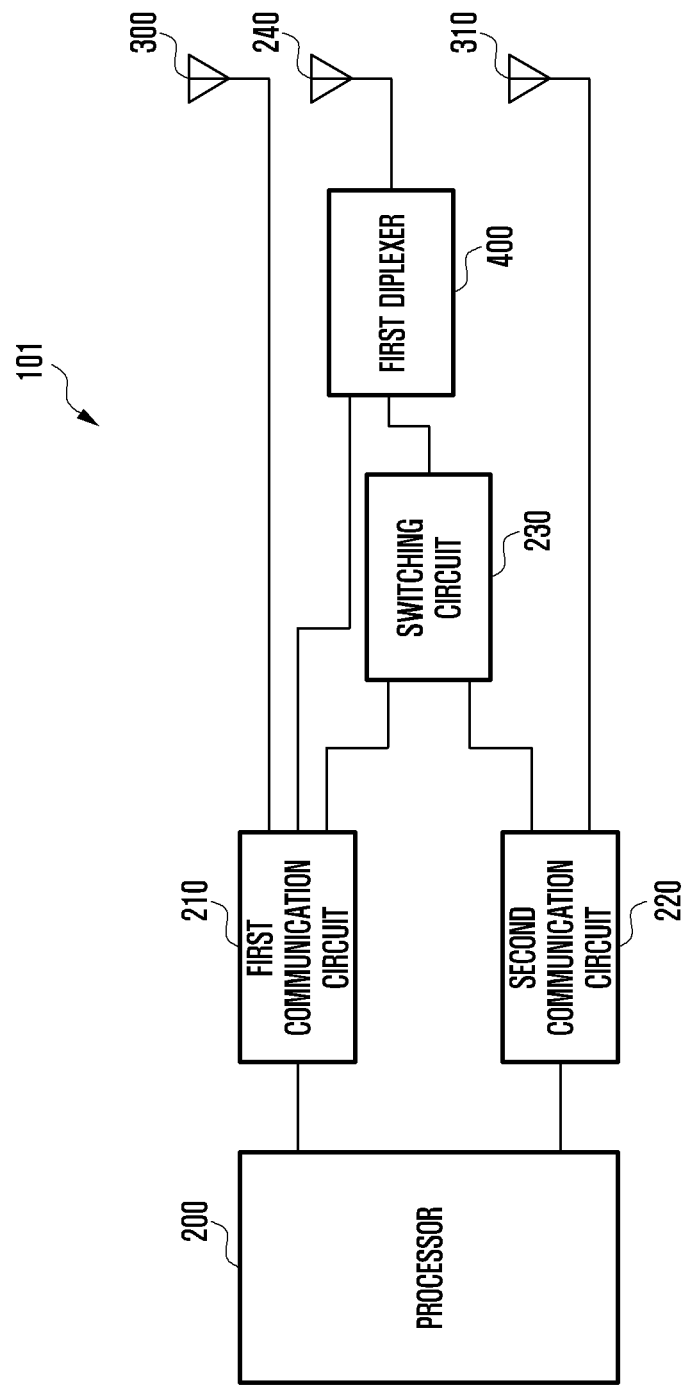
FIG. 4 is a block diagram of an example electronic device for controlling a connection between an antenna and a communication circuit based on an operation mode and a frequency band of the electronic device according to various embodiments.

FIG. 4 is a block diagram of an example electronic device for controlling a connection between an antenna and a communication circuit based on an operation mode and a frequency band of the electronic device according to various embodiments.

According to various embodiments with reference to FIG. 4, the electronic device 101 may include a processor 200, a first communication circuit 210, a second communication circuit 220, a switching circuit 230, a first antenna 240, a second antenna 300, a third antenna 310 and/or a first diplexer 400. According to an embodiment, because the processor 200, the first communication circuit 210, the second communication circuit 220, and the switching circuit 230 of FIG. 4 are configured the same as the processor 200, the first communication circuit 210, the second communication circuit 220, and the switching circuit 230 of FIG. 2, a detailed description thereof will not be repeated here.

According to various embodiments, the first diplexer 400 may separate signals transmitted and/or received through the first and second frequency bands supported by the first antenna 240 into signals of the first subband (e.g., about 2.4 GHz band) and the second subband (e.g., about 5 GHz band) of the first frequency band and/or the second frequency band.

According to various embodiments, the switching circuit 230 may electrically connect the first communication circuit 210 and/or the second communication circuit 220 to the first diplexer 400. According to an embodiment, the switching circuit 230 may release the electrical connection between the first diplexer 400 and the first communication circuit 210 and/or the second communication circuit 220 operating in the scan mode. For example, in a case in which the first communication circuit 210 operates in the scan mode, the switching circuit 230 may release the electrical connection between the first communication circuit 210 and the first diplexer 400. In a case in which the second communication circuit 220 operates in the scan mode, the switching circuit 230 may release the electrical connection between the second communication circuit 220 and the first diplexer 400.

According to an embodiment, the switching circuit 230 may electrically connect the first diplexer 400 to first communication circuit 210 and/or the second communication circuit 220 operating in the communication mode. For example, in a case in which the first communication circuit 210 operates in the communication mode, the switching circuit 230 may electrically connect the first communication circuit 210 to the first diplexer 400. In a case in which the second communication circuit 220 operates in the communication mode, the switching circuit 230 may electrically connect the second communication circuit 220 to the first diplexer 400.

According to various embodiments, the first communication circuit 210 may transmit and/or receive signals and/or data to and from an external electronic device (e.g., a transmission node and/or an access point (AP)) through the electrically connected first antenna 240 and/or the second antenna 300. According to an embodiment, in a case in which the first communication circuit 210 performs a scan related to the first subband (e.g., about 2.4 GHz band) of the first frequency band, the first communication circuit 210 may scan at least one channel corresponding to the first subband of the first frequency band through the first antenna 240 and/or the second antenna 300. According to an embodiment, in a case in which the first communication circuit 210 performs a scan related to the second subband of the first frequency band, the first communication circuit 210 may scan at least one channel corresponding to the second subband of the first frequency band through the second antenna 300.

According to an embodiment, in a case in which the first communication circuit 210 operates in the communication mode, the first communication circuit 210 may transmit and/or receive data to and from an external electronic device through the first antenna 240 and/or the second antenna 300.

According to various embodiments, the second communication circuit 220 may transmit and/or receive signals and/or data to and from an external electronic device (e.g., a transmission node and/or an AP) through the electrically connected first antenna 240 and/or the third antenna 310. According to an embodiment, in a case in which the second communication circuit 220 operates in the scan mode, the second communication circuit 220 may scan at least one channel corresponding to a partial band (e.g., the second subband) of the first frequency band and/or the second frequency band through the third antenna 310 supporting a partial band (e.g., the second subband) of the first frequency band and the second frequency band.

According to an embodiment, in a case in which the second communication circuit 220 operates in the communication mode, the second communication circuit 220 may transmit and/or receive data to and from an external electronic device through the first antenna 240 and/or the third antenna 310.

Figure 5:
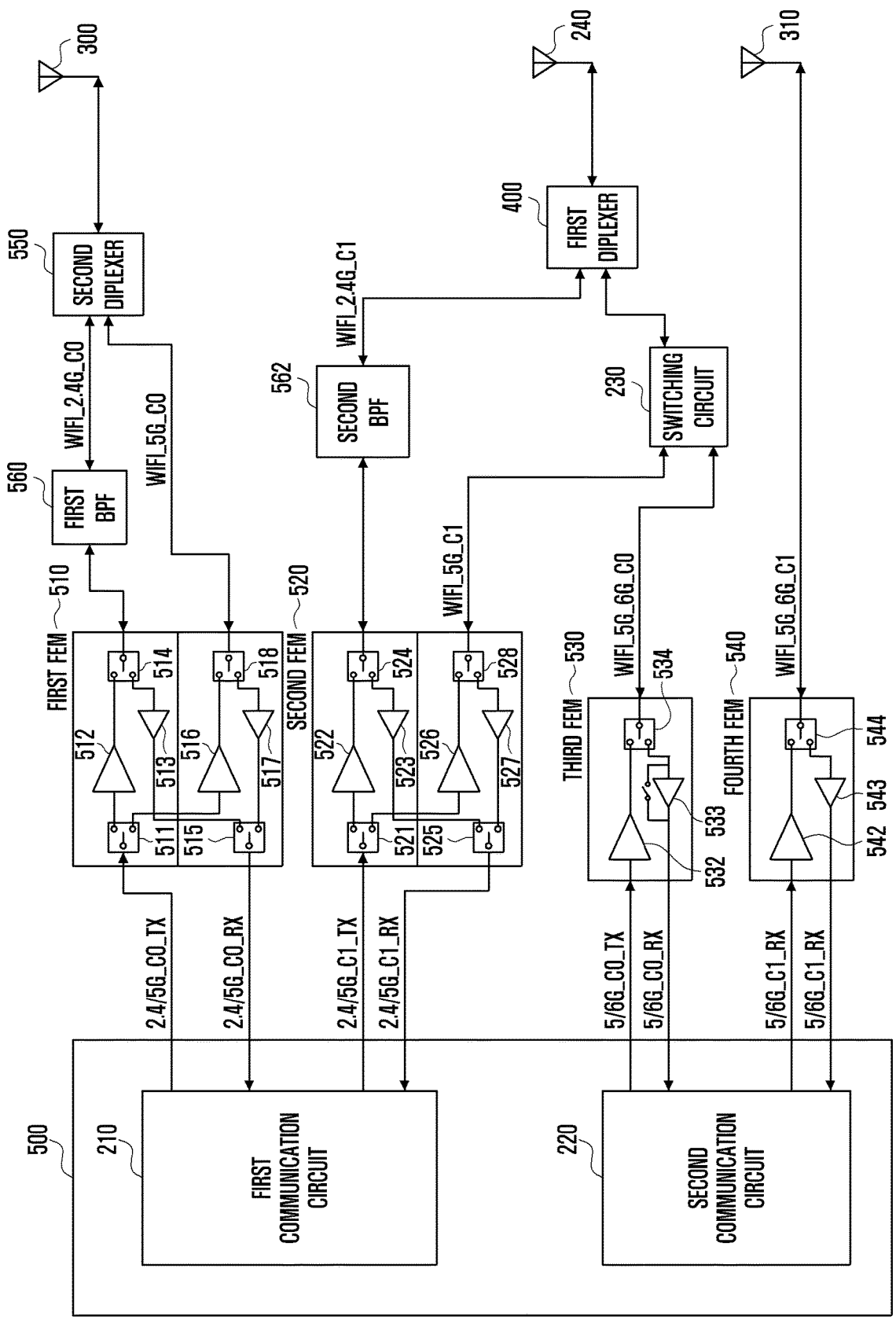
FIG. 5 is a block diagram of an example electronic device for controlling a connection between an antenna and a communication circuit based on an operation mode and a frequency band of the electronic device according to various embodiments.

FIG. 5 is a block diagram of an example electronic device for controlling a connection between an antenna and a communication circuit based on an operation mode and a frequency band of the electronic device according to various embodiments.

According to various embodiments with reference to FIG. 5, the electronic device 101 may include a communication circuit 500 for transmitting and/or receiving signals and/or data to and from an external electronic device (e.g., a transmission node and/or an AP) through wireless LAN communication (WLAN).

According to various embodiments, the communication circuit 500 may include the first communication circuit 210 and the second communication circuit 220. According to an embodiment, the first communication circuit 210 may transmit and/or receive signals and/or data to and from an external electronic device through the first frequency band (e.g., about 2.4 GHz band and/or about 5 GHz band) of wireless LAN communication. According to an embodiment, the second communication circuit 220 may transmit and/or receive signals and/or data to and from an external electronic device through a partial band (e.g., the second subband or about 5 GHz band) of the first frequency band and the second frequency band (e.g., about 6 GHz band) of wireless LAN communication. According to an embodiment, the first communication circuit 210 and the second communication circuit 220 may be logically (e.g., software) divided within the communication circuit 500. According to an embodiment, the first communication circuit 210 and the second communication circuit 220 may be configured with different circuits or different hardware.

According to various embodiments, the first front end module (FEM) 510 may process signals and/or data transmitted and/or received by the first communication circuit 210 through the second antenna 300. According to an embodiment, the first FEM 510 may include a plurality of switches 511, 514, 515, and/or 518, a plurality of power amplifiers (PAs) 512 and/or 516 and/or a plurality of low-noise amplifiers (LNAs) 513 and/or 517. For example, a plurality of switches 511, 514, 515, and/or 518 may operate based on the control of the processor 200 and/or the communication circuit 500 (e.g., the first communication circuit 210).

According to an embodiment, the first switch 511 may electrically connect the first communication circuit 210 to the first power amplifier 512 or the second power amplifier 516. For example, the first switch 511 may electrically connect the first communication circuit 210 to the first power amplifier 512 to process signals of the first subband (e.g., about 2.4 GHz band) of the first frequency band in the first communication circuit 210. For example, the first switch 511 may electrically connect the first communication circuit 210 to the second power amplifier 516 to process signals of the second subband (e.g., about 5 GHz band) of the first frequency band in the first communication circuit 210.

According to an embodiment, the first power amplifier 512 may amplify power of a signal corresponding to the first subband (e.g., about 2.4 GHz band) of the first frequency band provided from the first communication circuit 210 through the first switch 511 and output the power to the first band-pass filter (BPF) 560 through the second switch 514.

According to an embodiment, the second power amplifier 516 may amplify power of a signal corresponding to the second subband (e.g., about 5 GHz band) of the first frequency band provided from the first communication circuit 210 through the first switch 511 and output the power to the second diplexer 550 through the fourth switch 518.

According to an embodiment, the second switch 514 may electrically connect the first band-pass filter 560 to the first power amplifier 512 or the first low-noise amplifier 513. For example, the second switch 514 may electrically connect the first band-pass filter 560 to the first power amplifier 512 to transmit signals and/or data corresponding to the first subband (e.g., about 2.4 GHz band) of the first frequency band through the second antenna 300. For example, the second switch 514 may electrically connect the first band-pass filter 560 to the first low-noise amplifier 513 to receive signals and/or data corresponding to the first subband (e.g., about 2.4 GHz band) of the first frequency band through the second antenna 300.

According to an embodiment, the first low-noise amplifier 513 may low-noise amplify a signal corresponding to the first subband (e.g., about 2.4 GHz band) of the first frequency band provided from the first band-pass filter 560 through the second switch 514, and output the signal to the first communication circuit 210 through the third switch 515.

According to an embodiment, the fourth switch 518 may electrically connect the second diplexer 550 to the second power amplifier 516 or the second low-noise amplifier 517. For example, the fourth switch 518 may electrically connect the second diplexer 550 to the second power amplifier 516 to transmit signals and/or data corresponding to the second subband (e.g., about 5 GHz band) of the first frequency band through the second antenna 300. For example, the fourth switch 518 may electrically connect the second diplexer 550 to the second low-noise amplifier 517 to receive signals and/or data corresponding to the second subband (e.g., about 5 GHz band) of the first frequency band through the second antenna 300.

According to an embodiment, the second low-noise amplifier 517 may low-noise amplify a signal corresponding to the second subband (e.g., about 5 GHz band) of the first frequency band provided from the second diplexer 550 through the fourth switch 518, and output the signal to the first communication circuit 210 through the third switch 515.

According to an embodiment, the third switch 515 may electrically connect the first communication circuit 210 to the first low-noise amplifier 513 or the second low-noise amplifier 517. For example, the third switch 515 may electrically connect the first communication circuit 210 to the first low-noise amplifier 513 to process signals of the first subband (e.g., about 2.4 GHz band) of the first frequency band in the first communication circuit 210. For example, the third switch 515 may electrically connect the first communication circuit 210 to the second low-noise amplifier 517 to process signals of the second subband (e.g., about 5 GHz band) of the first frequency band in the first communication circuit 210.

According to various embodiments, the first band-pass filter 560 may filter signals and/or data corresponding to the first subband (e.g., about 2.4 GHz band) of the first frequency band transmitted and/or received through the second antenna 300.

According to various embodiments, the second diplexer 550 may separate a signal transmitted and/or received through the first frequency band supported by the second antenna 300 into a signal of the first subband (e.g., about 2.4 GHz band) of the first frequency band and a signal of the second subband (e.g., about 5 GHz band) of the first frequency band.

According to various embodiments, the second FEM 520 may process signals and/or data transmitted and/or received by the first communication circuit 210 through the first antenna 240. According to an embodiment, the second FEM 520 may include a plurality of switches 521, 524, 525, and/or 528, a plurality of power amplifiers 522 and/or 526 and/or a plurality of low-noise amplifiers 523, and/or 527. For example, a plurality of switches 521, 524, 525, and/or 528 may operate based on the control of the processor 200 and/or the communication circuit 500 (e.g., the first communication circuit 210).

According to an embodiment, the fifth switch 521 may electrically connect the first communication circuit 210 to the third power amplifier 522 or the fourth power amplifier 526. For example, the fifth switch 521 may electrically connect the first communication circuit 210 to the third power amplifier 522 to process signals of the first subband (e.g., about 2.4 GHz band) of the first frequency band in the first communication circuit 210. For example, the fifth switch 521 may electrically connect the first communication circuit 210 to the fourth power amplifier 526 to process signals of the second subband (e.g., about 5 GHz band) of the first frequency band in the first communication circuit 210.

According to an embodiment, the third power amplifier 522 may amplify power of a signal corresponding to the first subband (e.g., about 2.4 GHz band) of the first frequency band provided from the first communication circuit 210 through the fifth switch 521 and output the power to the second band-pass filter (BPF) 562 through the sixth switch 524.

According to an embodiment, the fourth power amplifier 526 may amplify power of a signal corresponding to the second subband (e.g., about 5 GHz band) of the first frequency band provided from the first communication circuit 210 through the fifth switch 521 and output the power to the switching circuit 230 through the eighth switch 528.

According to an embodiment, the sixth switch 524 may electrically connect the second band-pass filter 562 to the third power amplifier 522 or the third low-noise amplifier 523. For example, the sixth switch 524 may electrically connect the second band-pass filter (BPF) 562 to the third power amplifier 522 to transmit signals and/or data corresponding to the first subband (e.g., about 2.4 GHz band) of the first frequency band through the first antenna 240. For example, the sixth switch 524 may electrically connect the second band-pass filter 562 to the third low-noise amplifier 523 to receive signals and/or data corresponding to the first subband (e.g., about 2.4 GHz band) of the first frequency band through the first antenna 240.

According to an embodiment, the third low-noise amplifier 523 may low-noise amplify a signal corresponding to the first subband (e.g., about 2.4 GHz band) of the first frequency band provided from the second band-pass filter 562 through the sixth switch 524, and output the signal to the first communication circuit 210 through the seventh switch 525.

According to an embodiment, the eighth switch 528 may electrically connect the switching circuit 230 to the fourth power amplifier 526 or the fourth low-noise amplifier 527. For example, the eighth switch 528 may electrically connect the switching circuit 230 to the fourth power amplifier 526 to transmit signals and/or data corresponding to the second subband (e.g., about 5 GHz band) of the first frequency band through the first antenna 240. For example, the eighth switch 528 may electrically connect the switching circuit 230 to the fourth low-noise amplifier 527 to receive signals and/or data corresponding to the second subband (e.g., about 5 GHz band) of the first frequency band through the first antenna 240.

According to an embodiment, the fourth low-noise amplifier 527 may low-noise amplify a signal corresponding to the second subband (e.g., about 5 GHz band) of the first frequency band provided from the switching circuit 230 through the eighth switch 528, and output the signal to the first communication circuit 210 through the seventh switch 525.

According to an embodiment, the seventh switch 525 may electrically connect the first communication circuit 210 to the third low-noise amplifier 523 or the fourth low-noise amplifier 527. For example, the seventh switch 525 may electrically connect the first communication circuit 210 to the third low-noise amplifier 523 to process signals of the first subband (e.g., about 2.4 GHz band) of the first frequency band in the first communication circuit 210. For example, the seventh switch 525 may electrically connect the first communication circuit 210 to the fourth low-noise amplifier 527 to process signals of the second subband (e.g., about 5 GHz band) of the first frequency band in the first communication circuit 210.

According to an embodiment, the second band-pass filter 562 may filter signals and/or data corresponding to the first subband (e.g., about 2.4 GHz band) of the first frequency band transmitted and/or received through the first antenna 240.

According to various embodiments, the third FEM 530 may process signals and/or data transmitted and/or received by the second communication circuit 220 through the first antenna 240. According to an embodiment, the third FEM 530 may include the fifth power amplifier 532, the fifth low-noise amplifier 533, and/or the ninth switch 534. For example, the ninth switch 534 may operate based on the control of the processor 200 and/or the communication circuit 500 (e.g., the second communication circuit 220).

According to an embodiment, the fifth power amplifier 532 may amplify power of a signal corresponding to the second subband (e.g., about 5 GHz band) of the first frequency band and/or the second frequency band provided from the second communication circuit 220 and output the power to the switching circuit 230 through the ninth switch 534.

According to an embodiment, the ninth switch 534 may electrically connect the switching circuit 230 to the fifth power amplifier 532 or the fifth low-noise amplifier 533. For example, the ninth switch 534 may electrically connect the switching circuit 230 to the fifth power amplifier 532 to transmit signals and/or data corresponding to the second subband (e.g., about 5 GHz band) of the first frequency band and/or the second frequency band through the first antenna 240. For example, the ninth switch 534 may electrically connect the switching circuit 230 to the fifth low-noise amplifier 533 to receive signals and/or data corresponding to the second subband (e.g., about 5 GHz band) of the first frequency band and/or the second frequency band through the first antenna 240.

According to an embodiment, the fifth low-noise amplifier 533 may low-noise amplify a signal corresponding to the second subband (e.g., about 5 GHz band) of the first frequency band and/or the second frequency band provided from the switching circuit 230 through the ninth switch 534, and output the signal to the second communication circuit 220.

According to various embodiments, the fourth FEM 540 may process signals and/or data transmitted and/or received by the second communication circuit 220 through the third antenna 310. According to an embodiment, the fourth FEM 540 may include the sixth power amplifier 542, the sixth low-noise amplifier 543, and/or the tenth switch 544. For example, the tenth switch 544 may operate based on the control of the processor 200 and/or the communication circuit 500 (e.g., the second communication circuit 220).

According to an embodiment, the sixth power amplifier 542 may amplify power of a signal corresponding to the second subband (e.g., about 5 GHz band) of the first frequency band and/or the second frequency band provided from the second communication circuit 220 and output the power to the third antenna 310 through the tenth switch 544.

According to an embodiment, the tenth switch 544 may electrically connect the third antenna 310 to the sixth power amplifier 542 or the sixth low-noise amplifier 543. For example, the tenth switch 544 may electrically connect the third antenna 310 to the sixth power amplifier 542 to transmit signals and/or data corresponding to the second subband (e.g., about 5 GHz band) of the first frequency band and/or the second frequency band through the third antenna 310. For example, the tenth switch 544 may electrically connect the third antenna 310 to the sixth low-noise amplifier 543 to receive signals and/or data corresponding to the second subband (e.g., about 5 GHz band) of the first frequency band and/or the second frequency band through the third antenna 310.

According to an embodiment, the sixth low-noise amplifier 543 may low-noise amplify a signal corresponding to the second subband (e.g., about 5 GHz band) of the first frequency band and/or the second frequency band provided from the third antenna 310 through the tenth switch 544, and output the signal to the second communication circuit 220.

According to various embodiments, the switching circuit 230 may electrically connect the second FEM 520 (e.g., the first communication circuit 210) and/or the third FEM 530 (e.g., the second communication circuit 220) to the first diplexer 400. According to an embodiment, in a case in which the first communication circuit 210 operates in the scan mode, the switching circuit 230 may release the electrical connection between the second FEM 520 and the first diplexer 400. In a case in which the second communication circuit 220 operates in the scan mode, the switching circuit 230 may release the electrical connection between the third FEM 530 and the first diplexer 400. According to an embodiment, in a case in which the first communication circuit 210 operates in the communication mode, the switching circuit 230 may electrically connect the second FEM 520 to the first diplexer 400. In a case in which the second communication circuit 220 operates in the communication mode, the switching circuit 230 may electrically connect the third FEM 530 to the first diplexer 400.

Figure 6:
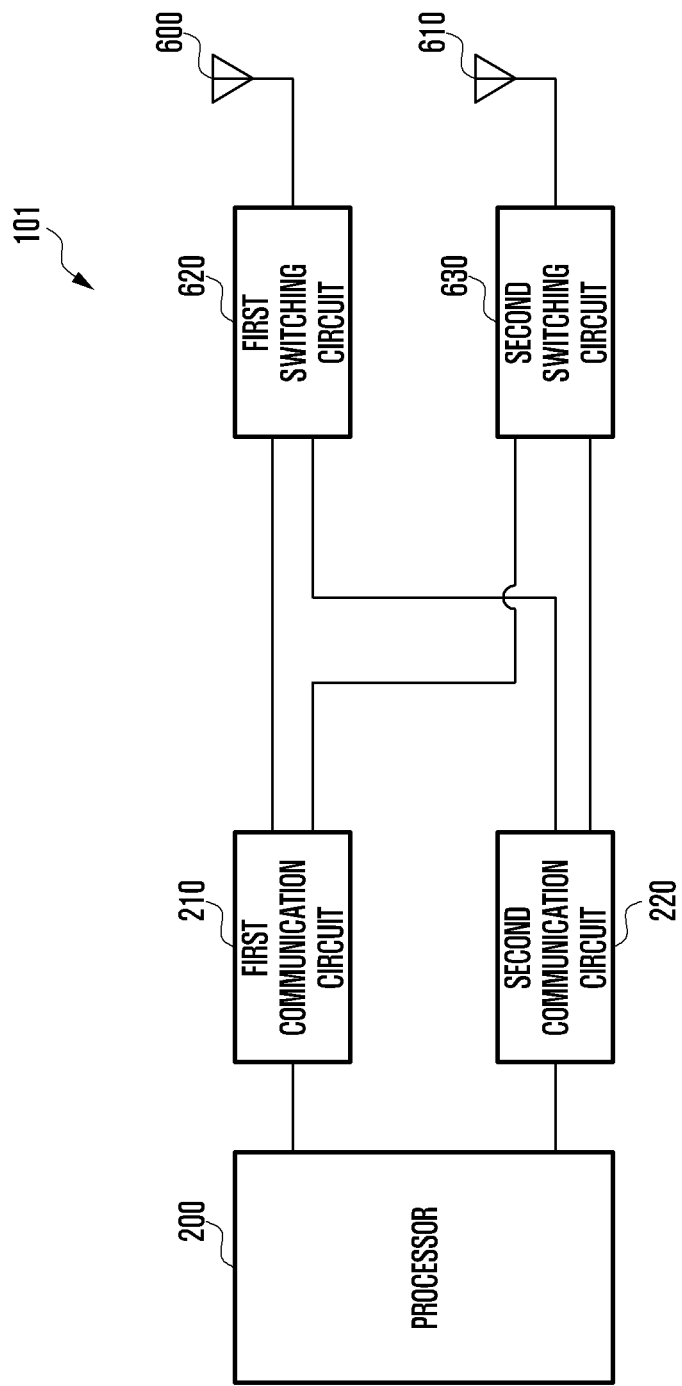
FIG. 6 is a block diagram of an example electronic device for controlling a connection between an antenna and a communication circuit based on an operation mode of the electronic device according to various embodiments.

FIG. 6 is a block diagram of an example electronic device for controlling a connection between an antenna and a communication circuit based on an operation mode of the electronic device according to various embodiments.

According to various embodiments with reference to FIG. 6, the electronic device 101 may include a processor 200, a first communication circuit 210, a second communication circuit 220, a first switching circuit 620, a second switching circuit 630, a fourth antenna 600, and/or a fifth antenna 610. According to an embodiment, the fourth antenna 600 and/or the fifth antenna 610 may be substantially the same as the antenna module 197 of FIG. 1 or may be included in the antenna module 197. According to an embodiment, because the processor 200, the first communication circuit 210, and the second communication circuit 220 of FIG. 6 are configured the same as the processor 200, the first communication circuit 210, and the second communication circuit 220 of FIG. 2, a detailed description thereof will not be repeated here.

According to various embodiments, the first switching circuit 620 may electrically connect the first communication circuit 210 and/or the second communication circuit 220 to the fourth antenna 600. According to an embodiment, the first switching circuit 620 may electrically connect the first communication circuit 210 to the fourth antenna 600 regardless of the operation mode of the first communication circuit 210. According to an embodiment, the first switching circuit 620 may release the electrical connection between the second communication circuit 220 operating in the scan mode and the fourth antenna 600. According to an embodiment, the first switching circuit 620 may electrically connect the second communication circuit 220 operating in the communication mode to the fourth antenna 600. For example, the fourth antenna 600 may support the first frequency band and the second frequency band.

According to various embodiments, the second switching circuit 630 may electrically connect the first communication circuit 210 and/or the second communication circuit 220 to the fifth antenna 610. According to an embodiment, the second switching circuit 630 may electrically connect the second communication circuit 220 to the fifth antenna 610 regardless of the operation mode of the second communication circuit 220. According to an embodiment, the second switching circuit 630 may release the electrical connection between the first communication circuit 210 operating in the scan mode and the fifth antenna 610. According to an embodiment, the second switching circuit 630 may electrically connect the first communication circuit 210 operating in the communication mode to the fifth antenna 610. For example, the fifth antenna 610 may support the first frequency band and the second frequency band.

According to various embodiments, the first communication circuit 210 may transmit and/or receive signals and/or data to and from an external electronic device (e.g., a transmission node and/or AP) through the electrically connected fourth antenna 600 and/or the fifth antenna 610. According to an embodiment, in a case in which the first communication circuit 210 operates in the scan mode, the first communication circuit 210 may scan at least one channel corresponding to the first frequency band through the fourth antenna 600. According to an embodiment, in a case in which the first communication circuit 210 operates in the communication mode, the first communication circuit 210 may transmit and/or receive data to and from an external electronic device through the fourth antenna 600 and/or the fifth antenna 610.

According to various embodiments, the second communication circuit 220 may transmit and/or receive signals and/or data to and from an external electronic device (e.g., a transmission node and/or AP) through the electrically connected fourth antenna 600 and/or the fifth antenna 610. According to an embodiment, in a case in which the second communication circuit 220 operates in the scan mode, the second communication circuit 220 may scan at least one channel corresponding to a partial band of the first frequency band and/or the second frequency band through the fifth antenna 610. According to an embodiment, in a case in which the second communication circuit 220 operates in the communication mode, the second communication circuit 220 may transmit and/or receive data to and from an external electronic device through the fourth antenna 600 and/or the fifth antenna 610.

Figure 7:
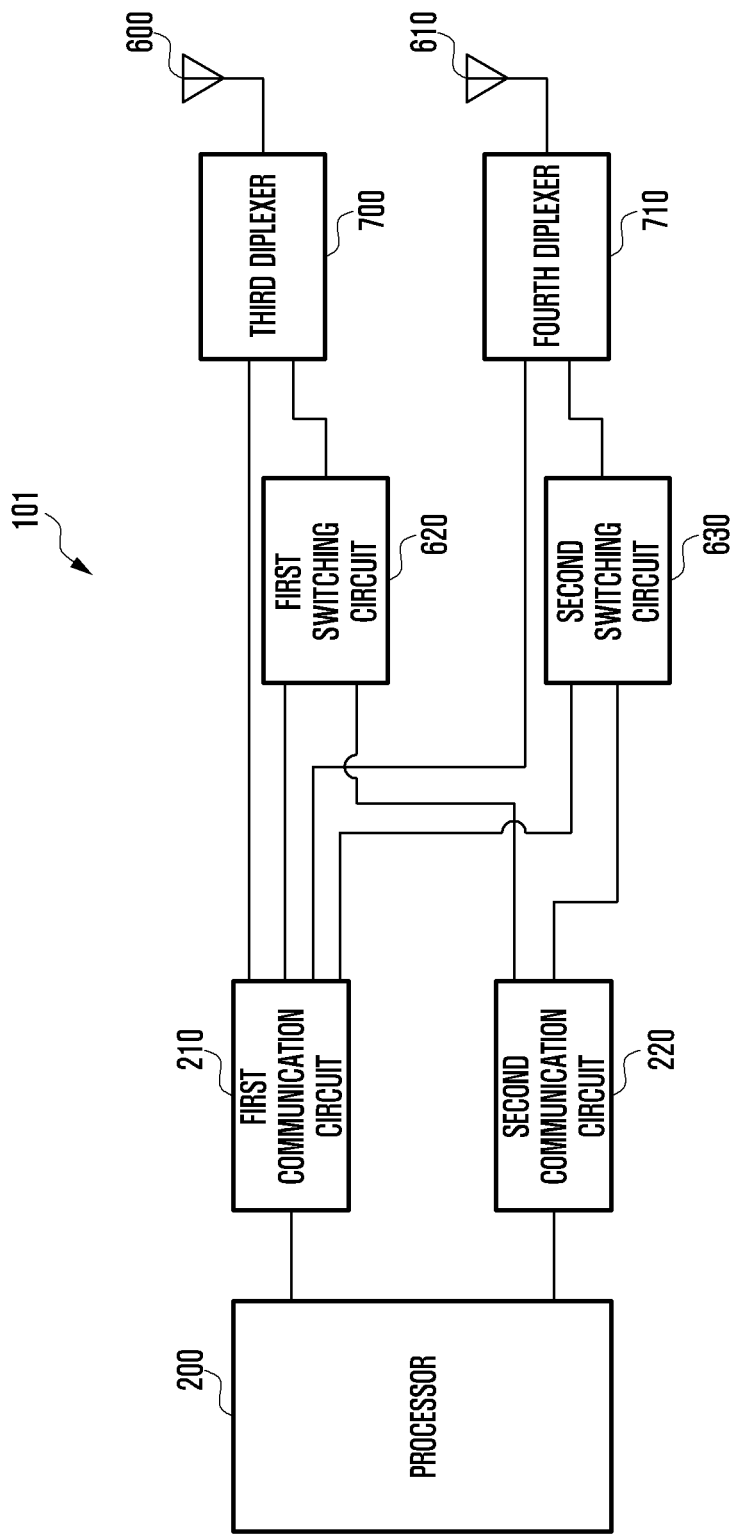
FIG. 7 is a block diagram of an example electronic device for controlling a connection between an antenna and a communication circuit based on an operation mode and a frequency band of the electronic device according to various embodiments.

FIG. 7 is a block diagram of an example electronic device for controlling a connection between an antenna and a communication circuit based on an operation mode and a frequency band of the electronic device according to various embodiments.

According to various embodiments with reference to FIG. 7, the electronic device 101 may include a processor 200, a first communication circuit 210, a second communication circuit 220, a first switching circuit 620, a second switching circuit 630, a fourth antenna 600, a fifth antenna 610, a third diplexer 700, and/or a fourth diplexer 710. According to an embodiment, the fourth antenna 600 and/or the fifth antenna 610 may be substantially the same as the antenna module 197 of FIG. 1 or may be included in the antenna module 197. According to an embodiment, because the processor 200, the first communication circuit 210, and the second communication circuit 220 of FIG. 7 are configured the same as the processor 200, the first communication circuit 210, and the second communication circuit 220 of FIG. 2, a detailed description thereof will not be repeated here.

According to various embodiments, the third diplexer 700 may separate signals transmitted and/or received through the first and second frequency bands supported by the fourth antenna 600 into signals of the first subband (e.g., about 2.4 GHz band) and the second subband (e.g., about 5 GHz band) of the first frequency band and/or the second frequency band. According to an embodiment, the third diplexer 700 may be electrically connected to the first communication circuit 210 directly or electrically connected to the first communication circuit 210 through the first switching circuit 620. For example, the third diplexer 700 may directly transmit and/or receive a signal of the first subband (e.g., about 2.4 GHz band) of the first frequency band to and from the first communication circuit 210. For example, the third diplexer 700 may transmit and/or receive a signal of the second subband (e.g., about 5 GHz band) of the first frequency band to and from the first communication circuit 210 through the first switching circuit 620.

According to various embodiments, the first switching circuit 620 may electrically connect the first communication circuit 210 and/or the second communication circuit 220 to the third diplexer 700. According to an embodiment, the first switching circuit 620 may electrically connect the first communication circuit 210 to the third diplexer 700 regardless of the operation mode of the first communication circuit 210. According to an embodiment, the first switching circuit 620 may release the electrical connection between the second communication circuit 220 operating in the scan mode and the third diplexer 700. According to an embodiment, the first switching circuit 620 may electrically connect the second communication circuit 220 operating in the communication mode to the third diplexer 700.

According to various embodiments, the fourth diplexer 710 may separate signals transmitted and/or received through the first and second frequency bands supported by the fifth antenna 610 into signals of the first subband (e.g., about 2.4 GHz band) and the second subband (e.g., about 5 GHz band) of the first frequency band and/or the second frequency band. According to an embodiment, the fourth diplexer 710 may be electrically connected to the first communication circuit 210 directly or electrically connected to the first communication circuit 210 through the second switching circuit 630. For example, the fourth diplexer 710 may directly transmit and/or receive a signal of the first subband (e.g., about 2.4 GHz band) of the first frequency band to and from the first communication circuit 210. For example, the fourth diplexer 710 may transmit and/or receive a signal of the second subband (e.g., about 5 GHz band) of the first frequency band to and from the first communication circuit 210 through the second switching circuit 630.

According to various embodiments, the second switching circuit 630 may electrically connect the first communication circuit 210 and/or the second communication circuit 220 to the fourth diplexer 710. According to an embodiment, the second switching circuit 630 may electrically connect the second communication circuit 220 to the fourth diplexer 710 regardless of the operation mode of the second switching circuit 630. According to an embodiment, the second switching circuit 630 may release the electrical connection between the first communication circuit 210 operating in the scan mode and the fourth diplexer 710. According to an embodiment, the second switching circuit 630 may electrically connect the first communication circuit 210 operating in the communication mode to the fourth diplexer 710.

According to various embodiments, the first communication circuit 210 may transmit and/or receive signals and/or data to and from an external electronic device (e.g., a transmission node and/or AP) through the electrically connected fourth antenna 600 and/or the fifth antenna 610. According to an embodiment, in a case in which the first communication circuit 210 performs a scan related to the remaining first subband (e.g., about 2.4 GHz band) of the first frequency band, the first communication circuit 210 may scan at least one channel corresponding to the first subband (e.g., about 2.4 GHz band) of the first frequency band through the fourth antenna 600 and the fifth antenna 610. According to an embodiment, in a case in which the first communication circuit 210 performs a scan related to the second subband (e.g., about 5 GHz band) of the first frequency band, the first communication circuit 210 may scan at least one channel corresponding to the second subband (e.g., about 5 GHz band) of the first frequency band through the fourth antenna 600. According to an embodiment, in a case in which the first communication circuit 210 operates in the communication mode, the first communication circuit 210 may transmit and/or receive data to and from an external electronic device through the fourth antenna 600 and/or the fifth antenna 610.

According to various embodiments, the second communication circuit 220 may transmit and/or receive signals and/or data to and from an external electronic device (e.g., a transmission node and/or AP) through the electrically connected fourth antenna 600 and/or the fifth antenna 610. According to an embodiment, in a case in which the second communication circuit 220 operates in the scan mode, the second communication circuit 220 may scan at least one channel corresponding to the second subband (e.g., about 5 GHz band) of the first frequency band and/or the second frequency band through the fifth antenna 610. According to an embodiment, in a case in which the second communication circuit 220 operates in the communication mode, the second communication circuit 220 may transmit and/or receive data to and from an external electronic device through the fourth antenna 600 and/or the fifth antenna 610.

According to various embodiments, the electronic device (e.g., the electronic device 101 of FIG. 1, FIG. 2, FIG. 3, and/or FIG. 6) may include at least one first antenna (e.g., the antenna module 197 of FIG. 1, the first antenna 240 of FIG. 2 or 3, or the fourth antenna 600 and/or the fifth antenna 610 of FIG. 6) supporting a first frequency band and a second frequency band of a wireless LAN communication method, a first communication circuit (e.g., the wireless communication module 192 of FIG. 1, the first communication circuit 210 of FIG. 2, 3, and/or FIG. 6) supporting a first subband and a second subband of the first frequency band, a second communication circuit (e.g., the wireless communication module 192 of FIG. 1, the second communication circuit 220 of FIG. 2, 3, and/or FIG. 6) supporting the second subband of the first frequency band and the second frequency band, and a processor (e.g., the processor 120 of FIG. 1, the processor 200 of FIGS. 2, 3, and/or 6) operatively connected to the first communication circuit and the second communication circuit, and the processor may identify an operating mode of at least one of the first communication circuit or the second communication circuit, release an electrical connection of at least one of the first communication circuit or the second communication circuit operating in a scan mode with the at least one first antenna in a case in which at least one of the first communication circuit or the second communication circuit operates in the scan mode, and electrically connect the at least one first antenna to at least one of the first communication circuit or the second communication circuit operating in a communication mode in a case in which at least one of the first communication circuit or the second communication circuit operates in the communication mode.

According to various embodiments, a second antenna (e.g., the antenna module 197 of FIG. 1 and/or the second antenna 300 of FIG. 3) supporting the first frequency band and a third antenna (e.g., the antenna module 197 of FIG. 1 and/or the third antenna 310 of FIG. 3) supporting the second subband of the first frequency band and the second frequency band may be further included, and the first communication circuit may perform a scan related to the first frequency band or the first subband of the first frequency band through the second antenna in the scan mode, and the second communication circuit may perform a scan related to the second subband of the first frequency band and/or the second frequency band through the third antenna in the scan mode.

According to various embodiments, the first communication circuit may perform at least one of transmitting or receiving data through at least one of the at least one of the first antenna or the second antenna in the communication mode, and the second communication circuit may perform at least one of transmitting or receiving data through at least one of the at least one of the first antenna and the third antenna in the communication mode.

According to various embodiments, a switching circuit (e.g., the switching circuit 230 of FIGS. 2, 3 and/or 6) located in an electrical path between the at least one first antenna and the first and second communication circuits may be further included, and the processor may control the switching circuit to release the electrical connection of at least one of the first communication circuit or the second communication circuit operating in the scan mode with the at least one first antenna in a case in which at least one of the first communication circuit or the second communication circuit operates in the scan mode, and may control the switching circuit to electrically connect the at least one first antenna to at least one of the first communication circuit or the second communication circuit operating in the communication mode in a case in which at least one of the first communication circuit or the second communication circuit operates in the communication mode. According to various embodiments, the at least one first antenna includes a fourth antenna (e.g., the fourth antenna 600 of FIG. 6) and a fifth antenna (e.g., the fifth antenna 610 of FIG. 6), the processor may release an electrical connection between the fourth antenna and the second communication circuit in a case in which the second communication circuit operates in the scan mode and may release an electrical connection between the fifth antenna and the first communication circuit in a case in which the first communication circuit operates in the scan mode, the first communication circuit may perform a scan related to the first frequency band or the first subband of the first frequency band through the fourth antenna in the scan mode, and the second communication circuit may perform a scan related to the second subband of the first frequency band and/or the second frequency band through the fifth antenna in the scan mode.

According to various embodiments, the first communication circuit may perform at least one of transmitting or receiving data through at least one of the fourth antenna or the fifth antenna in the communication mode, and the second communication circuit may perform at least one of transmitting or receiving data through at least one of the fourth antenna or the fifth antenna in the communication mode.

According to various embodiments, a first switching circuit (e.g., the first switching circuit 620 of FIG. 6) located in an electrical path between the fourth antenna and the first and second communication circuits and a second switching circuit (e.g., the second switching circuit 630 of FIG. 6) located in an electrical path between the fifth antenna and the first and second communication circuits may be further included, and the processor may control the first switching circuit to release the electrical connection between the fourth antenna and the second communication circuit in a case in which the second communication circuit operates in the scan mode, and control the second switching circuit to release the electrical connection between the fifth antenna and the first communication circuit in a case in which the first communication circuit operates in the scan mode, and may control the second switching circuit to electrically connect the fourth antenna to the second communication circuit in a case in which the second communication circuit operates in the communication mode, and to electrically connect the fifth antenna to the first communication circuit in a case in which the first communication circuit operates in the communication mode.

According to various embodiments, the first switching circuit may maintain an electrical connection between the fourth antenna and the first communication circuit in a case in which the first communication circuit and/or the second communication circuit operate in the scan mode, and the second switching circuit may maintain an electrical connection between the fifth antenna and the second communication circuit in a case in which the first communication circuit and/or the second communication circuit operate in the scan mode.

According to various embodiments, the first frequency band may include a 2.4 GHz to 2.5 GHz band and a 5 GHz to 5.9 GHz band, the first subband of the first frequency band may include a 2.4 GHz to 2.5 GHz band, the second subband of the first frequency band may include a 5 GHz to 5.9 GHz band, and the second frequency band may include a 5.9 GHz to 7.2 GHz band.

According to various embodiments, the processor may release the electrical connection between the at least one first antenna and the first communication circuit in a case in which the first communication circuit operates in the scan mode, and the second communication circuit may maintain an electrical connection with the at least one first antenna based on the communication mode.

According to various embodiments, the electronic device (e.g., the electronic device 101 of FIG. 1, FIG. 4, FIG. 5, FIG. 7, and/or FIG. 8) may include at least one first antenna (e.g., the antenna module 197 of FIG. 1, the first antenna 240 of FIG. 4 or 5, or the fourth antenna 600 and/or the fifth antenna 610 of FIG. 7 and/or FIG. 8) supporting a first frequency band and a second frequency band of a wireless LAN communication method, a first communication circuit (e.g., the wireless communication module 192 of FIG. 1, the first communication circuit 210 of FIG. 4, FIG. 5, FIG. 7, and/or FIG. 8) supporting a first subband and a second subband of the first frequency band, a second communication circuit (e.g., the wireless communication module 192 of FIG. 1 and the processor 200 of FIG. 4, FIG. 5, FIG. 7, and/or FIG. 8) supporting the second subband of the first frequency band and the second frequency band, and a processor (e.g., the processor 120 of FIG. 1 and the processor 200 of FIG. 4, FIG. 5, FIG. 7, and/or FIG. 8) operatively connected to the first communication circuit and the second communication circuit, and the processor may identify an operating mode of at least one of the first communication circuit or the second communication circuit, release an electrical connection of at least one of the first communication circuit operating in a scan mode with the at least one first antenna or the second communication circuit in a case in which at least one of the first communication circuit or the second communication circuit operates in the scan mode related to at least one of the second subband of the first frequency band or the second frequency band, and maintain an electrical connection between the at least one first antenna and the first communication circuit in a case in which the first communication circuit operates in a scan mode related to the first subband of the first frequency band.

According to various embodiments, the processor may electrically connect the at least one first antenna to at least one of the first communication circuit or the second communication circuit operating in a communication mode in a case in which at least one of the first communication circuit or the second communication circuit operates in the communication mode.

According to various embodiments, the processor may release an electrical connection between the at least one first antenna and the second communication circuit in a case in which the first communication circuit operates in a scan mode related to the first subband of the first frequency band.

According to various embodiments, the first frequency band may include a 2.4 GHz to 2.5 GHz band and a 5 GHz to 5.9 GHz band, the first subband of the first frequency band may include a 2.4 GHz to 2.5 GHz band, the second subband of the first frequency band may include a 5 GHz to 5.9 GHz band, and the second frequency band may include a 5.9 GHz to 7.2 GHz band.

Figure 8:
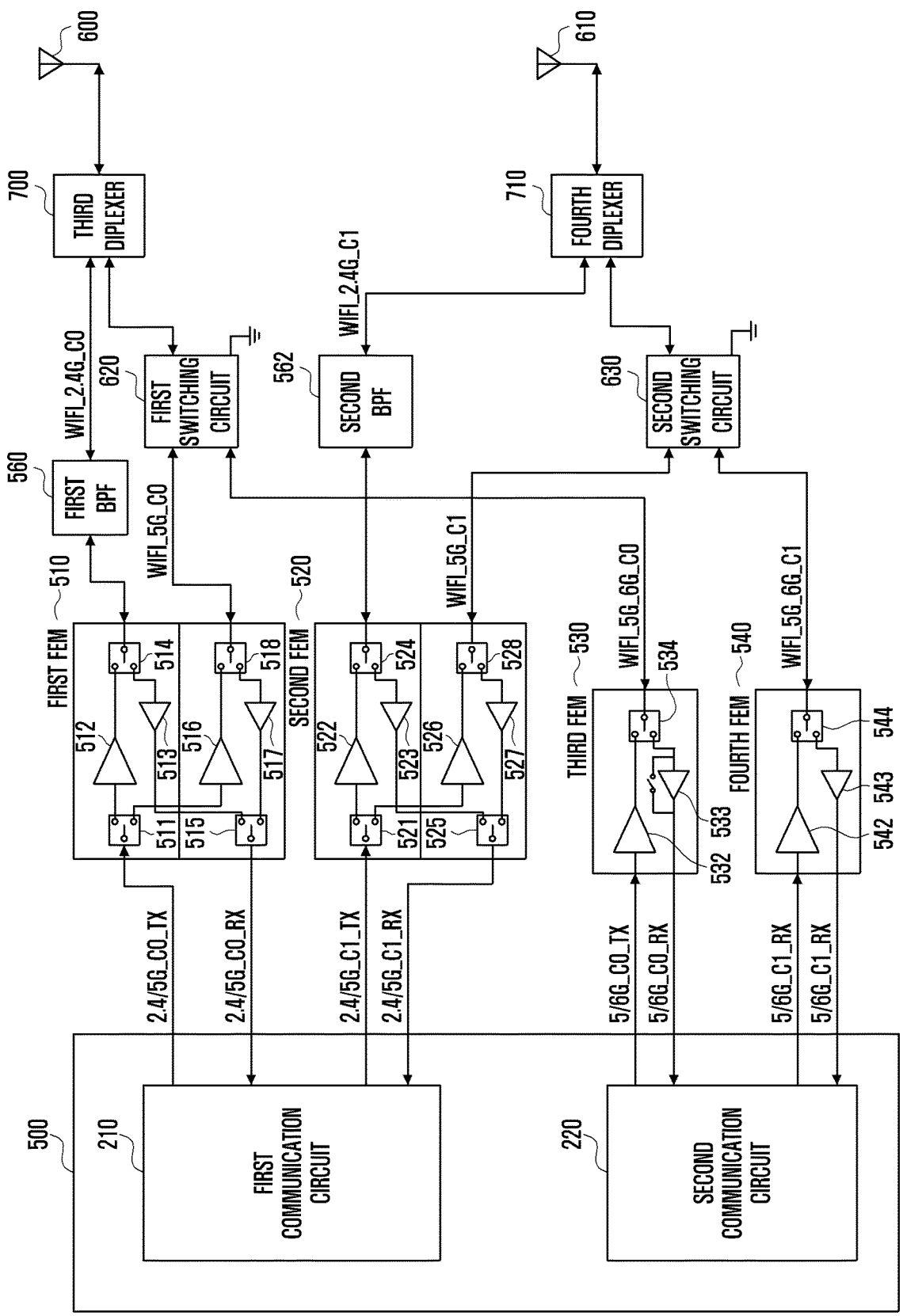
FIG. 8 is a block diagram of an example electronic device for controlling a connection between an antenna and a communication circuit based on an operation mode and a frequency band of the electronic device according to various embodiments.

FIG. 8 is a block diagram of an example electronic device for controlling a connection between an antenna and a communication circuit based on an operation mode and a frequency band of the electronic device according to various embodiments.

According to various embodiments with reference to FIG. 8, the electronic device 101 may include a communication circuit 500 for transmitting and/or receiving signals and/or data to and from an external electronic device (e.g., a transmission node and/or an AP) through wireless LAN communication (WLAN).

According to various embodiments, the communication circuit 500 may include the first communication circuit 210 and the second communication circuit 220. According to an embodiment, the first communication circuit 210 may transmit and/or receive signals and/or data to and from an external electronic device through the first frequency band (e.g., about 2.4 GHz band and/or about 5 GHz band) of wireless LAN communication. According to an embodiment, the second communication circuit 220 may transmit and/or receive signals and/or data to and from an external electronic device through a partial band (e.g., the second subband or about 5 GHz band) of the first frequency band and the second frequency band (e.g., about 6 GHz band) of wireless LAN communication.

According to various embodiments, the FEM 510 may process signals and/or data transmitted and/or received by the first communication circuit 210 through the fourth antenna 600. According to an embodiment, the first FEM 510 may include a plurality of switches 511, 514, 515, and/or 518, a plurality of power amplifiers 512 and/or 516 and/or a plurality of low-noise amplifiers 513 and/or 517.

According to an embodiment, the first switch 511 may electrically connect the first communication circuit 210 to the first power amplifier 512 or the second power amplifier 516. For example, the first switch 511 may electrically connect the first communication circuit 210 to the first power amplifier 512 to process signals of the first subband (e.g., about 2.4 GHz band) of the first frequency band in the first communication circuit 210. For example, the first switch 511 may electrically connect the first communication circuit 210 to the second power amplifier 516 to process signals of the second subband (e.g., about 5 GHz band) of the first frequency band in the first communication circuit 210.

According to an embodiment, the first power amplifier 512 may amplify power of a signal corresponding to the first subband (e.g., about 2.4 GHz band) of the first frequency band provided from the first communication circuit 210 through the first switch 511 and output the power to the first band-pass filter (BPF) 560 through the second switch 514.

According to an embodiment, the second power amplifier 516 may amplify power of a signal corresponding to the second subband (e.g., about 5 GHz band) of the first frequency band provided from the first communication circuit 210 through the first switch 511 and output the power to the first switching circuit 620 through the fourth switch 518.

According to an embodiment, the second switch 514 may electrically connect the first band-pass filter 560 to the first power amplifier 512 or the first low-noise amplifier 513. For example, the second switch 514 may electrically connect the first band-pass filter 560 to the first power amplifier 512 to transmit signals and/or data corresponding to the first subband (e.g., about 2.4 GHz band) of the first frequency band through the fourth antenna 600. For example, the second switch 514 may electrically connect the first band-pass filter 560 to the first low-noise amplifier 513 to receive signals and/or data corresponding to the first subband (e.g., about 2.4 GHz band) of the first frequency band through the fourth antenna 600.

According to an embodiment, the first low-noise amplifier 513 may low-noise amplify a signal corresponding to the first subband (e.g., about 2.4 GHz band) of the first frequency band provided from the first band-pass filter 560 through the second switch 514, and output the signal to the first communication circuit 210 through the third switch 515.

According to an embodiment, the fourth switch 518 may electrically connect the first switching circuit 620 to the second power amplifier 516 or the second low-noise amplifier 517. For example, the fourth switch 518 may electrically connect the first switching circuit 620 to the second power amplifier 516 to transmit signals and/or data corresponding to the second subband (e.g., about 5 GHz band) of the first frequency band through the fourth antenna 600. For example, the fourth switch 518 may electrically connect the first switching circuit 620 to the second low-noise amplifier 517 to receive signals and/or data corresponding to the second subband (e.g., about 5 GHz band) of the first frequency band through the fourth antenna 600.

According to an embodiment, the second low-noise amplifier 517 may low-noise amplify a signal corresponding to the second subband (e.g., about 5 GHz band) of the first frequency band provided from the first switching circuit 620 through the fourth switch 518, and output the signal to the first communication circuit 210 through the third switch 515.

According to an embodiment, the third switch 515 may electrically connect the first communication circuit 210 to the first low-noise amplifier 513 or the second low-noise amplifier 517. For example, the third switch 515 may electrically connect the first communication circuit 210 to the first low-noise amplifier 513 to process signals of the first subband (e.g., about 2.4 GHz band) of the first frequency band in the first communication circuit 210. For example, the third switch 515 may electrically connect the first communication circuit 210 to the second low-noise amplifier 517 to process signals of the second subband (e.g., about 5 GHz band) of the first frequency band in the first communication circuit 210.

According to various embodiments, the second FEM 520 may process signals and/or data transmitted and/or received by the first communication circuit 210 through the fifth antenna 610. According to an embodiment, the second FEM 520 may include a plurality of switches 521, 524, 525, and/or 528, a plurality of power amplifiers 522 and/or 526 and/or a plurality of low-noise amplifiers 523, and/or 527.

According to an embodiment, the fifth switch 521 may electrically connect the first communication circuit 210 to the third power amplifier 522 or the fourth power amplifier 526. For example, the fifth switch 521 may electrically connect the first communication circuit 210 to the third power amplifier 522 to process signals of the first subband (e.g., about 2.4 GHz band) of the first frequency band in the first communication circuit 210. For example, the fifth switch 521 may electrically connect the first communication circuit 210 to the fourth power amplifier 526 to process signals of the second subband (e.g., about 5 GHz band) of the first frequency band in the first communication circuit 210.

According to an embodiment, the third power amplifier 522 may amplify power of a signal corresponding to the first subband (e.g., about 2.4 GHz band) of the first frequency band provided from the first communication circuit 210 through the fifth switch 521 and output the power to the second band-pass filter (BPF) 562 through the sixth switch 524.

According to an embodiment, the fourth power amplifier 526 may amplify power of a signal corresponding to the second subband (e.g., about 5 GHz band) of the first frequency band provided from the first communication circuit 210 through the fifth switch 521 and output the power to the second switching circuit 630 through the eighth switch 528.

According to an embodiment, the sixth switch 524 may electrically connect the second band-pass filter 562 to the third power amplifier 522 or the third low-noise amplifier 523. For example, the sixth switch 524 may electrically connect the second band-pass filter (BPF) 562 to the third power amplifier 522 to transmit signals and/or data corresponding to the first subband (e.g., about 2.4 GHz band) of the first frequency band through the fifth antenna 610. For example, the sixth switch 524 may electrically connect the second band-pass filter 562 to the third low-noise amplifier 523 to receive signals and/or data corresponding to the first subband (e.g., about 2.4 GHz band) of the first frequency band through the fifth antenna 610.

According to an embodiment, the third low-noise amplifier 523 may low-noise amplify a signal corresponding to the first subband (e.g., about 2.4 GHz band) of the first frequency band provided from the second band-pass filter 562 through the sixth switch 524, and output the signal to the first communication circuit 210 through the seventh switch 525.

According to an embodiment, the eighth switch 528 may electrically connect the second switching circuit 630 to the fourth power amplifier 526 or the fourth low-noise amplifier 527. For example, the eighth switch 528 may electrically connect the second switching circuit 630 to the fourth power amplifier 526 to transmit signals and/or data corresponding to the second subband (e.g., about 5 GHz band) of the first frequency band through the fifth antenna 610. For example, the eighth switch 528 may electrically connect the second switching circuit 630 to the fourth low-noise amplifier 527 to receive signals and/or data corresponding to the second subband (e.g., about 5 GHz band) of the first frequency band through the fifth antenna 610.

According to an embodiment, the fourth low-noise amplifier 527 may low-noise amplify a signal corresponding to the second subband (e.g., about 5 GHz band) of the first frequency band provided from the second switching circuit 630 through the eighth switch 528, and output the signal to the first communication circuit 210 through the seventh switch 525.

According to an embodiment, the seventh switch 525 may electrically connect the first communication circuit 210 to the third low-noise amplifier 523 or the fourth low-noise amplifier 527. For example, the seventh switch 525 may electrically connect the first communication circuit 210 to the third low-noise amplifier 523 to process signals of the first subband (e.g., about 2.4 GHz band) of the first frequency band in the first communication circuit 210. For example, the seventh switch 525 may electrically connect the first communication circuit 210 to the fourth low-noise amplifier 527 to process signals of the second subband (e.g., about 5 GHz band) of the first frequency band in the first communication circuit 210.

According to various embodiments, the third FEM 530 may process signals and/or data transmitted and/or received by the second communication circuit 220 through the fourth antenna 600. According to an embodiment, the third FEM 530 may include the fifth power amplifier 532, the fifth low-noise amplifier 533, and/or the ninth switch 534.

According to an embodiment, the fifth power amplifier 532 may amplify power of a signal corresponding to the second subband (e.g., about 5 GHz band) of the first frequency band and/or the second frequency band provided from the second communication circuit 220 and output the power to the first switching circuit 620 through the ninth switch 534.

According to an embodiment, the ninth switch 534 may electrically connect the first switching circuit 620 to the fifth power amplifier 532 or the fifth low-noise amplifier 533. For example, the ninth switch 534 may electrically connect the first switching circuit 620 to the fifth power amplifier 532 to transmit signals and/or data corresponding to the second subband (e.g., about 5 GHz band) of the first frequency band and/or the second frequency band through the fourth antenna 600. For example, the ninth switch 534 may electrically connect the first switching circuit 620 to the fifth low-noise amplifier 533 to receive signals and/or data corresponding to the second subband (e.g., about 5 GHz band) of the first frequency band and/or the second frequency band through the fourth antenna 600.

According to an embodiment, the fifth low-noise amplifier 533 may low-noise amplify a signal corresponding to the second subband (e.g., about 5 GHz band) of the first frequency band and/or the second frequency band provided from the first switching circuit 620 through the ninth switch 534, and output the signal to the second communication circuit 220.

According to various embodiments, the fourth FEM 540 may process signals and/or data transmitted and/or received by the second communication circuit 220 through the fifth antenna 610. According to an embodiment, the fourth FEM 540 may include the sixth power amplifier 542, the sixth low-noise amplifier 543, and/or the tenth switch 544.

According to an embodiment, the sixth power amplifier 542 may amplify power of a signal corresponding to the second subband (e.g., about 5 GHz band) of the first frequency band and/or the second frequency band provided from the second communication circuit 220 and output the power to the second switching circuit 630 through the tenth switch 544.

According to an embodiment, the tenth switch 544 may electrically connect the second switching circuit 630 to the sixth power amplifier 542 or the sixth low-noise amplifier 543. For example, the tenth switch 544 may electrically connect the second switching circuit 630 to the sixth power amplifier 542 to transmit signals and/or data corresponding to the second subband (e.g., about 5 GHz band) of the first frequency band and/or the second frequency band through the fifth antenna 610. For example, the tenth switch 544 may electrically connect the second switching circuit 630 to the sixth low-noise amplifier 543 to receive signals and/or data corresponding to the second subband (e.g., about 5 GHz band) of the first frequency band and/or the second frequency band through the fifth antenna 610.

According to an embodiment, the sixth low-noise amplifier 543 may low-noise amplify a signal corresponding to the second subband (e.g., about 5 GHz band) of the first frequency band and/or the second frequency band provided from the fifth antenna 610 through the tenth switch 544, and output the signal to the second communication circuit 220.

According to various embodiments, the first switching circuit 620 may electrically connect the first FEM 510 (e.g., the first communication circuit 210) and/or the third FEM 530 (e.g., the second communication circuit 220) to the third diplexer 700. According to an embodiment, the first switching circuit 620 may electrically connect the first FEM 510 to the third diplexer 700 regardless of the operation mode of the first communication circuit 210. According to an embodiment, in a case in which the second communication circuit 220 operates in the scan mode, the first switching circuit 620 may release the electrical connection between the third FEM 530 and the third diplexer 700. According to an embodiment, in a case in which the second communication circuit 220 operates in the communication mode, the first switching circuit 620 may electrically connect the third FEM 530 to the third diplexer 700.

According to various embodiments, the second switching circuit 630 may electrically connect the second FEM 520 (e.g., the first communication circuit 210) and/or the fourth FEM 540 (e.g., the second communication circuit 220) to the fourth diplexer 710. According to an embodiment, the second switching circuit 630 may electrically connect the fourth FEM 540 to the fourth diplexer 710 regardless of the operation mode of the second communication circuit 220.

According to an embodiment, in a case in which the first communication circuit 210 operates in the scan mode, the second switching circuit 630 may release the electrical connection between the second FEM 520 and the fourth diplexer 710. According to an embodiment, in a case in which the first communication circuit 210 operates in the communication mode, the second switching circuit 630 may electrically connect the second FEM 520 to the fourth diplexer 710.

Figure 9:
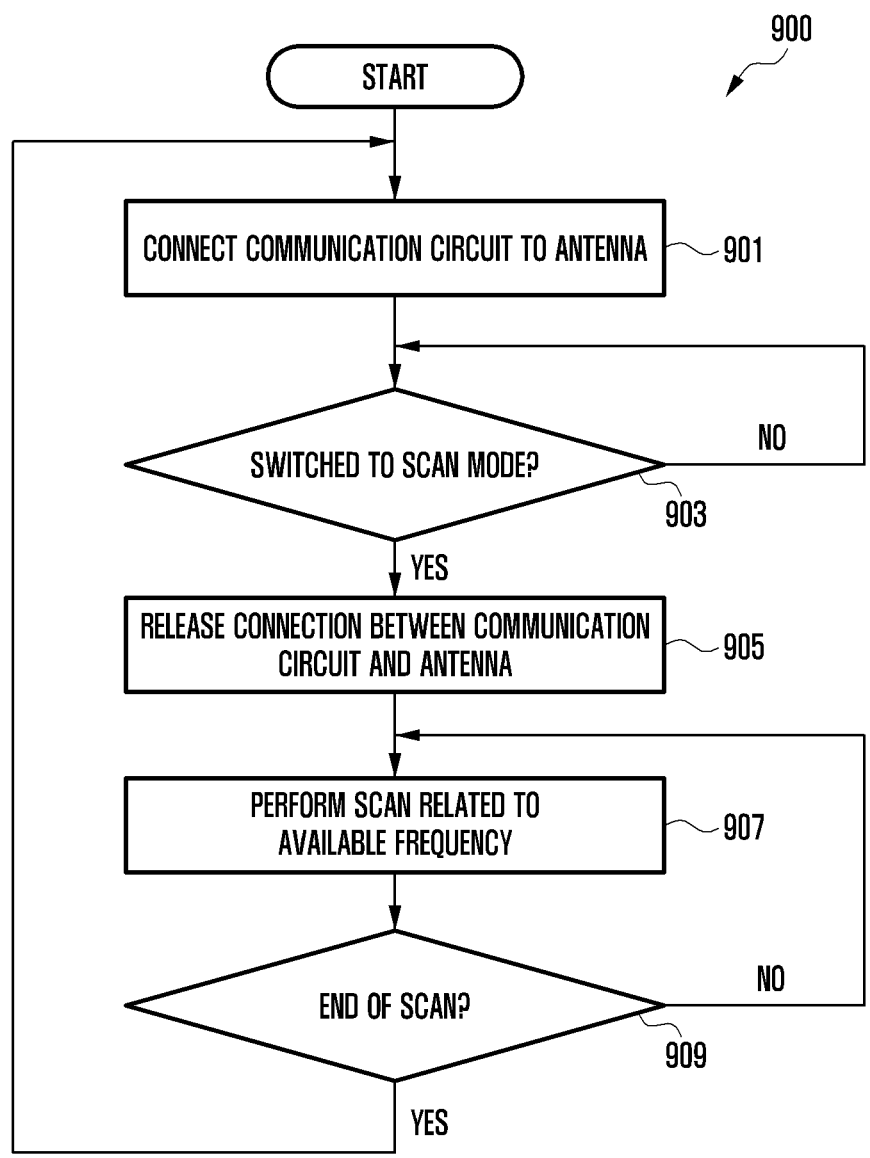
FIG. 9 is a flowchart for controlling a connection between a communication circuit and an antenna in an example electronic device according to various embodiments.

FIG. 9 is a flowchart 900 for controlling a connection between a communication circuit and an antenna in an example electronic device according to various embodiments. Operations in the following embodiments may be sequentially performed, but are not necessarily sequentially performed. For example, the order of the operations may be changed, and at least two operations may be performed in parallel. For example, the electronic device of FIG. 9 may be the electronic device 101 of FIG. 1, 2, 3, 4, 5, 6, 7 or 8.

According to various embodiments with reference to FIG. 9, in operation 901, the electronic device (e.g., the processor 120 of FIG. 1, the wireless communication module 192 of FIG. 1, the processor 200 of FIG. 2, the first communication circuit 210 of FIG. 2, and/or the second communication circuit 220 of FIG. 2) may electrically connect the communication circuit (e.g., the first communication circuit 210 and/or the second communication circuit 220 of FIG. 2) to at least one antenna (e.g., the first antenna 240 of FIG. 2). According to an embodiment, in a case in which the first communication circuit 210 and/or the second communication circuit 220 operates in the communication mode, the processor 200 may control the switching circuit 230 such that the first communication circuit 210 and/or the second communication circuit 220 is electrically connected to the first antenna 240. For example, at least one antenna may support the first frequency band and the second frequency band.

According to various embodiments, in operation 903, the electronic device (e.g., the processor 120 or 200) may identify whether the communication circuit (e.g., the first communication circuit 210 and/or the second communication circuit 220 of FIG. 2) is switched to the scan mode. According to an embodiment, in a case in which information related to switching to the scan mode is received from the first communication circuit 210 and/or the second communication circuit 220, the processor 200 may determine that the first communication circuit 210 and/or the second communication circuit 220 is switched to the scan mode. For example, the first communication circuit 210 and/or the second communication circuit 220 may operate (or switch) in the scan mode based on an execution of a wireless LAN configuration menu, a transition of the communication circuit from an inactive state to an active state, disconnection of wireless LAN communication with external electronic devices, and/or characteristics of an application program running in the electronic device 101.

According to various embodiments, in a case in which the communication circuit (e.g., the first communication circuit 210 and/or the second communication circuit 220 in FIG. 2) does not switch to the scan mode (e.g., 'no' in operation 903), in operation 903, the electronic device (e.g., the processor 120 or 200) may identify whether the communication circuit (e.g., the first communication circuit 210 and/or the second communication circuit 220 of FIG. 2) is switched to the scan mode.

According to various embodiments, in a case in which the communication circuit (e.g., the first communication circuit 210 and/or the second communication circuit 220 in FIG. 2) switches to the scan mode (e.g., 'yes' in operation 903), in operation 905, the electronic device (e.g., the processor 120 or 200) may release the electrical connection between the communication circuit (e.g., the first communication circuit 210 and/or the second communication circuit 220 of FIG. 2) switched to the scan mode and at least one antenna. According to an embodiment, in a case in which the first communication circuit 210 operates (or switches) in the scan mode, the switching circuit 230 may release the electrical connection between the first communication circuit 210 and the first antenna 240. In this case, the electrical connection between the first communication circuit 210 and the second antenna 300 of FIG. 3 may be maintained. According to an embodiment, in a case in which the second communication circuit 220 operates (or switches) in the scan mode, the switching circuit 230 may release the electrical connection between the second communication circuit 220 and the first antenna 240. In this case, the electrical connection between the second communication circuit 220 and the third antenna 310 of FIG. 3 may be maintained. According to an embodiment, in a case in which the first communication circuit 210 and the second communication circuit 220 operate (or switch) in the scan mode, the switching circuit 230 may release the electrical connection between the first communication circuit 210 and the second communication circuit 220 and the first antenna 240.

According to various embodiments, in operation 907, the electronic device (e.g., the processor 120 or 200, the wireless communication module 192, the first communication circuit 210, and/or the second communication circuit 220) may perform a scan related to an available frequency band of a wireless LAN communication method supported by the electronic device 101. According to an embodiment, in a case in which the first communication circuit 210 operates in the scan mode, the first communication circuit may receive a signal (e.g., a beacon signal) periodically transmitted from the external electronic device through the second antenna 300 (or the fourth antenna 600 of FIG. 6) and search for an external electronic device that the electronic device 101 may access through the first frequency band. According to an embodiment, in a case in which the first communication circuit 210 operates in the scan mode, the first communication circuit may transmit a probe request signal through at least one channel included in the first frequency band through the second antenna 300 (or the fourth antenna 600). The first communication circuit 210 may receive a probe response signal corresponding to the probe request signal transmitted through at least one channel through the second antenna 300 (or the fourth antenna 600), and search for an external electronic device that the electronic device 101 may access through the first frequency band. For example, the first communication circuit 210 may transmit the probe request signal through at least one channel (e.g., a PSC) spaced apart by a specified interval (e.g., about 4 channels) among channels included in the first frequency band.

According to an embodiment, in a case in which the second communication circuit 220 operates in the scan mode, the second communication circuit may receive a signal (e.g., a beacon signal) periodically transmitted from the external electronic device through the third antenna 310 (or the fifth antenna 610 of FIG. 6) and search for an external electronic device that the electronic device 101 may access through a partial band (e.g., the second subband or about 5 GHz band) of the first frequency band and/or the second frequency band. According to an embodiment, in a case in which the second communication circuit 220 operates in the scan mode, the second communication circuit may transmit a probe request signal through at least one channel included in a partial band (e.g., the second subband) of the first frequency band and/or the second frequency band through the third antenna 310 (or the fifth antenna 610 of FIG. 6). The second communication circuit 220 may receive a probe response signal corresponding to the probe request signal transmitted through at least one channel through the third antenna 310 (or the fifth antenna 610 of FIG. 6), and search for an external electronic device that the electronic device 101 may access through a partial band (e.g., the second subband) of the first frequency band and/or the second frequency band. For example, the second communication circuit 220 may transmit the probe request signal through at least one channel (e.g., a PSC) spaced apart by a specified interval (e.g., about 4 channels) among channels included in a partial band (e.g., the second subband) of the first frequency band and/or the second frequency band.

According to various embodiments, in operation 909, the electronic device (e.g., the processor 120 or 200) may identify whether the communication circuit (e.g., the first communication circuit 210 and/or the second communication circuit 220 of FIG. 2) is switched to the communication mode. According to an embodiment, in a case in which information related to switching to the communication mode is received from the first communication circuit 210 and/or the second communication circuit 220, the processor 200 may determine that the first communication circuit 210 and/or the second communication circuit 220 is switched to the communication mode. According to an embodiment, the processor 200 may identify whether the first communication circuit 210 and/or the second communication circuit 220 operates (or switches) in the communication mode based on information related to a designated scan execution period. For example, the scan execution period may include a time period defined for the electronic device 101 to perform scanning According to various embodiments, in a case in which the communication circuit (e.g., the first communication circuit 210 and/or the second communication circuit 220 in FIG. 2) does not switch to the communication mode (e.g., 'no' in operation 909), in operation 907, the electronic device (e.g., the processor 120 or 200, the wireless communication module 192, the first communication circuit 210 and/or the second communication circuit 220) may perform a scan related to an available frequency band of a wireless LAN communication method supported by the electronic device 101.

According to various embodiments, in a case in which the communication circuit (e.g., the first communication circuit 210 and/or the second communication circuit 220 in FIG. 2) switches to the communication mode (e.g., 'yes' in operation 909), in operation 901, the electronic device (e.g., the processor 120 or 200, the wireless communication module 192, the first communication circuit 210 and/or the second communication circuit 220) may electrically connect the communication circuit (e.g., the first communication circuit 210 and/or the second communication circuit 220 of FIG. 2) to at least one antenna (e.g., the first antenna 240 of FIG. 2).

According to various embodiments, in a case in which the first communication circuit 210 and/or the second communication circuit 220 is in an active state, the electronic device 101 may electrically connect or disconnect the first communication circuit 210 and/or the second communication circuit 220 to or from at least one antenna based on the operation mode of the first communication circuit 210 and/or the second communication circuit 220. As an example, the active state of the first communication circuit 210 and/or the second communication circuit 220 may include a state in which power for driving the first communication circuit 210 and/or the second communication circuit 220 is supplied and the first communication circuit 210 and/or the second communication circuit 220 is driven.

In a case in which the first communication circuit 210 and/or the second communication circuit 220 is deactivated, the electronic device 101 may terminate operations 901 to 909 of FIG. 9. As an example, the deactive state of the first communication circuit 210 and/or the second communication circuit 220 is a state in which power supply for driving the first communication circuit 210 and/or the second communication circuit 220 is cut off or a state in which the driving of the first communication circuit 210 and/or the second communication circuit 220 is restricted in a state in which power is supplied.

Figure 10:
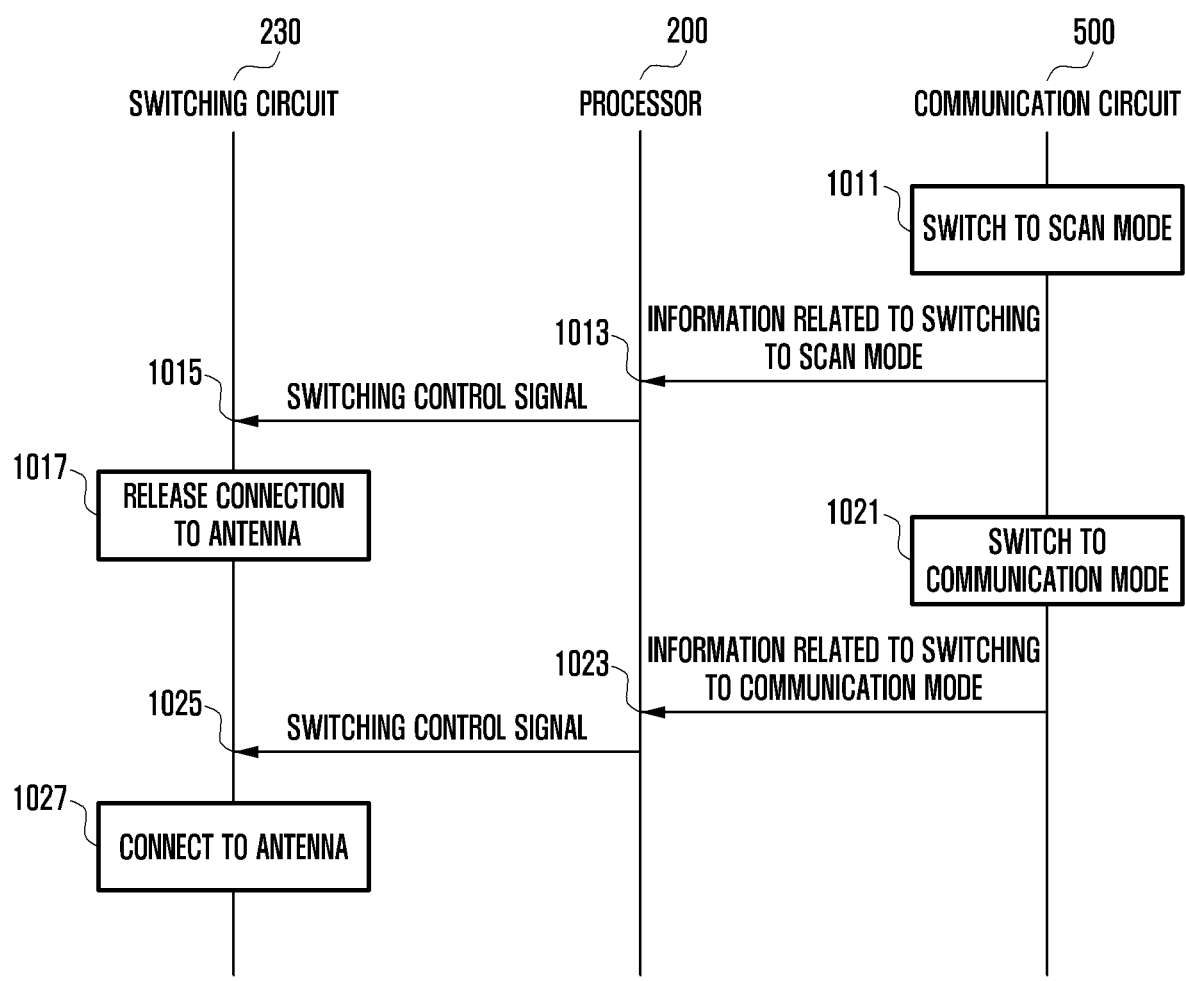
FIG. 10 is a sequence diagram for controlling a connection between a communication circuit and an antenna in a processor of an example electronic device according to various embodiments.

FIG. 10 is a sequence diagram for controlling a connection between a communication circuit and an antenna in a processor of an example electronic device according to various embodiments.

According to various embodiments with reference to FIG. 10, in operation 1011, the communication circuit 500 (e.g., the first communication circuit 210 and/or the second communication circuit 220) may be switched to the scan mode. According to an embodiment, the communication circuit 500 may be switched to the scan mode based on the execution of a wireless LAN setting menu, transition of the communication circuit 500 from an inactive state to an active state, disconnection of wireless LAN communication with an external electronic device, and/or characteristics of an application program running in the electronic device 101.

According to various embodiments, in operation 1013, in a case in which the communication circuit 500 (e.g., the first communication circuit 210 and/or the second communication circuit 220) is switched to the scan mode, the communication circuit 500 may transmit information related to switching to the scan mode to the processor 200.

According to various embodiments, in operation 1015, the processor 200 may transmit a switching control signal to the switching circuit 230 based on reception of information related to the switching to the scan mode from the communication circuit 500.

According to various embodiments, in operation 1017, the switching circuit 230 may release the electrical connection between the communication circuit 500 and the first antenna 240 based on the switching control signal. According to an embodiment, the switching circuit 230 may release the electrical connection between the communication circuit 500 and the first antenna 240 based on the switching control signal in a state in which the communication circuit 500 and the first antenna 240 are electrically connected.

According to various embodiments, in operation 1023, in a case in which the communication circuit 500 (e.g., the first communication circuit 210 and/or the second communication circuit 220) is switched to the communication mode, the communication circuit 500 may transmit information related to switching to the communication mode to the processor 200.

According to various embodiments, in operation 1025, the processor 200 may transmit a switching control signal to the switching circuit 230 based on reception of information related to the switching to the communication mode from the communication circuit 500.

According to various embodiments, in operation 1027, the switching circuit 230 may electrically connect the communication circuit 500 to the first antenna 240 based on the switching control signal. According to an embodiment, the switching circuit 230 may electrically connect the communication circuit 500 to the first antenna 240 based on the switching control signal in a state in which the electrical connection between the communication circuit 500 and the first antenna 240 is released.

According to various embodiments, the operation method of the electronic device (e.g., the electronic device 101 of FIG. 1, FIG. 2, FIG. 3, and/or FIG. 6) including at least one first antenna (e.g., the antenna module 197 of FIG. 1, the first antenna 240 of FIG. 2 or 3, or the fourth antenna 600 and/or the fifth antenna 610 of FIG. 6) supporting a first frequency band and a second frequency band of a wireless LAN communication method, a first communication circuit (e.g., the wireless communication module 192 of FIG. 1, the first communication circuit 210 of FIG. 2, 3, and/or FIG. 6) supporting a first subband and a second subband of the first frequency band, and a second communication circuit (e.g., the wireless communication module 192 of FIG. 1, the second communication circuit 220 of FIG. 2, 3, and/or FIG. 6) supporting the second subband of the first frequency band and the second frequency band may include identifying an operating mode of at least one of the first communication circuit or the second communication circuit, releasing an electrical connection of at least one of the first communication circuit or the second communication circuit operating in a scan mode with the at least one first antenna in a case in which at least one of the first communication circuit or the second communication circuit operates in the scan mode, and electrically connecting the at least one first antenna to at least one of the first communication circuit or the second communication circuit operating in a communication mode in a case in which at least one of the first communication circuit or the second communication circuit operates in the communication mode.

According to various embodiments, performing a scan related to the first frequency band or the first subband of the first frequency band through a second antenna (e.g., the antenna module 197 of FIG. 1 and/or the second antenna 300 of FIG. 3) supporting the first frequency band in a case in which the first communication circuit operates in the scan mode, or performing a scan related to the second subband of the first frequency band and/or the second frequency band through a third antenna (e.g., the antenna module 197 of FIG. 1 and/or the third antenna 310 of FIG. 3) supporting the second subband of the first frequency band and the second frequency band in a case in which the second communication circuit operates in the scan mode may be further included.

According to various embodiments, performing at least one of transmitting or receiving data through at least one of the at least one first antenna or the second antenna in a case in which the first communication circuit operates in the communication mode, or performing at least one of transmitting or receiving data through at least one of the at least one first antenna or the third antenna in a case in which the second communication circuit operates in the communication mode may be further included.

According to various embodiments, the at least one first antenna includes a fourth antenna (e.g., the fourth antenna 600 of FIG. 6) and a fifth antenna (e.g., the fifth antenna 610 of FIG. 6), releasing an electrical connection between the fourth antenna and the second communication circuit in a case in which the second communication circuit operates in the scan mode, releasing an electrical connection between the fifth antenna and the first communication circuit in a case in which the first communication circuit operates in the scan mode, performing a scan related to the first frequency band or the first subband of the first frequency band through the first communication circuit electrically connected to the fourth antenna, and performing a scan related to the second subband of the first frequency band and/or the second frequency band through the second communication circuit electrically connected to the fifth antenna may be further included.

According to various embodiments, performing at least one of transmitting or receiving data through at least one of the fourth antenna or the fifth antenna in a case in which the first communication circuit operates in the communication mode, or performing at least one of transmitting or receiving data through at least one of the fourth antenna or the fifth antenna in a case in which the second communication circuit operates in the communication mode may be further included.

According to various embodiments, the first frequency band may include a 2.4 GHz to 2.5 GHz band and a 5 GHz to 5.9 GHz band, the first subband of the first frequency band may include a 2.4 GHz to 2.5 GHz band, the second subband of the first frequency band may include a 5 GHz to 5.9 GHz band, and the second frequency band may include a 5.9 GHz to 7.2 GHz band.

The embodiments of the disclosure disclosed in the specification and drawings are merely provided for specific examples in order to easily explain the technical contents according to the embodiments of the disclosure and help the understanding of the embodiments of the disclosure, and are not intended to limit the scope of the embodiments of the disclosure. Accordingly, the scope of various embodiments of the disclosure should be construed that all changes or modifications derived based on the technical spirit of various embodiments of the disclosure are included in the scope of various embodiments of the disclosure in addition to the embodiments disclosed herein.

What is claimed is:

1. An electronic device comprising:
   memory storing instructions;
   at least one first antenna supporting a first band, a second band and a third band of a wireless LAN communication;
   a first communication circuit supporting the wireless LAN communication based on the first band and the second band;
   a second communication circuit supporting the wireless LAN communication based on the second band and the third band; and
   at least one processor comprising processing circuitry operatively connected to the first communication circuit and the second communication circuit,
   wherein the instructions, when executed by the at least one processor, cause the electronic device to:
      identify an operating mode of the first communication circuit and the second communication circuit;
      release an electrical connection between at least one of the first communication circuit or the second communication circuit operating in a scan mode and the at least one first antenna based on at least one of the first communication circuit or the second communication circuit operating in the scan mode; and
      electrically connect the at least one first antenna to at least one of the first communication circuit or the second communication circuit operating in a communication mode based on at least one of the first communication circuit or the second communication circuit operating in the communication mode.

2. The electronic device of claim 1, further comprising:
   a second antenna supporting the first band and the second band; and
   a third antenna supporting the second band and the third frequency band,
   wherein
   the first communication circuit is configured to perform a scan related to at least one of the first band or the second band through the second antenna in the scan mode, and
   the second communication circuit is configured to perform a scan related to at least one of the second band or the third band through the third antenna in the scan mode.

3. The electronic device of claim 2, wherein
   the first communication circuit is configured to perform at least one of transmitting or receiving data through at least one of the at least of the first antenna or the second antenna in the communication mode, and
   the second communication circuit is configured to perform at least one of transmitting or receiving data through at least one of the at least of the first antenna and the third antenna in the communication mode.

4. The electronic device of claim 1, further comprising:
   a switching circuit located in an electrical path between the at least one first antenna and the first and second communication circuits, wherein the instructions, when executed by the at least one processor, cause the electronic device to:
   control the switching circuit to release the electrical connection between at least one of the first communication circuit or the second communication circuit operating in the scan mode and the at least one first antenna based on at least one of the first communication circuit or the second communication circuit operating in the scan mode; and
   control the switching circuit to electrically connect the at least one first antenna to at least one of the first communication circuit or the second communication circuit operating in the communication mode based on at least one of the first communication circuit or the second communication circuit operating in the communication mode.

5. The electronic device of claim 1, wherein the at least one first antenna includes a fourth antenna and a fifth antenna,
   wherein the instructions, when executed by the at least one processor, cause the electronic device:
      release an electrical connection between the fourth antenna and the second communication circuit based on the second communication circuit operating in the scan mode; and
      release an electrical connection between the fifth antenna and the first communication circuit based on the first communication circuit operating in the scan mode,
   wherein the first communication circuit is configured to perform a scan related to at least one of the first band or the second band through the fourth antenna in the scan mode,
   wherein the second communication circuit is configured to perform a scan related to at least one of the second band or the third band through the fifth antenna in the scan mode.

6. The electronic device of claim 5,
   wherein the first communication circuit is configured to perform at least one of transmitting or receiving data through at least one of the fourth antenna or the fifth antenna in the communication mode,
   wherein the second communication circuit is configured to perform at least one of transmitting or receiving data through at least one of the fourth antenna or the fifth antenna in the communication mode.

7. The electronic device of claim 5, further comprising:
a first switching circuit located in an electrical path between the fourth antenna and the first and second communication circuits; and
a second switching circuit located in an electrical path between the fifth antenna and the first and second communication circuits,
wherein the instructions, when executed by the at least one processor, cause the electronic device to:
control the first switching circuit to release the electrical connection between the fourth antenna and the second communication circuit based on the second communication circuit operating in the scan mode, and control the second switching circuit to release the electrical connection between the fifth antenna and the first communication circuit based on the first communication circuit operating in the scan mode; and
control the second switching circuit to electrically connect the fourth antenna to the second communication circuit based on the second communication circuit operating in the communication mode, and to electrically connect the fifth antenna to the first communication circuit based on the first communication circuit operating in the communication mode.

8. The electronic device of claim 7,
wherein the first switching circuit is configured to maintain an electrical connection between the fourth antenna and the first communication circuit based on at least one of the first communication circuit or the second communication circuit operating in the scan mode, and
wherein the second switching circuit is configured to maintain an electrical connection between the fifth antenna and the second communication circuit based on at least one of the first communication circuit or the second communication circuit operating in the scan mode.

9. The electronic device of claim 1,
wherein the first band of the first band is configured to include a 2.4 GHz to 2.5 GHz band,
wherein the second band of the first band is configured to include a 5 GHz to 5.9 GHz band, and
wherein the third band is configured to include a 5.9 GHz to 7.2 GHz band.

10. The electronic device of claim 1,
wherein the instructions, when executed by the at least one processor, cause the electronic device to release the electrical connection between the at least one first antenna and the first communication circuit based on the first communication circuit operating in the scan mode, and
wherein the second communication circuit is configured to maintain an electrical connection with the at least one first antenna based on the communication mode.

11. A method of operating an electronic device including at least one first antenna supporting a frequency band, a second band and a third band of a wireless LAN communication, a first communication circuit supporting the wireless LAN communication based on the first band and the second band, and a second communication circuit supporting the wireless LAN communication based on the second band and the third band, the method comprising:
identifying an operating mode of the first communication circuit and the second communication circuit;
releasing an electrical connection between at least one of the first communication circuit or the second communication circuit operating in a scan mode and the at least one first antenna or the second communication circuit based on at least one of the first communication circuit or the second communication circuit operating in the scan mode; and
electrically connecting the at least one first antenna to at least one of the first communication circuit or the second communication circuit operating in a communication mode based on at least one of the first communication circuit or the second communication circuit operating in the communication mode.

12. The method of claim 11, further comprising:
performing a scan related to at least one of the first band or the second band through a second antenna supporting the first band and the second band based on the first communication circuit operating in the scan mode; or
performing a scan related to at least one of the second band or the third band through a third antenna supporting the second band and the third band based on the second communication circuit operating in the scan mode.

13. The method of claim 12, further comprising:
performing at least one of transmitting or receiving data through at least one of the at least one first antenna or the second antenna based on the first communication circuit operating in the communication mode; or
performing at least one of transmitting or receiving data through at least one of the at least one first antenna or the third antenna based on the second communication circuit operating in the communication mode.

14. The method of claim 11, wherein the at least one first antenna includes a fourth antenna and a fifth antenna, and the method further comprises:
releasing an electrical connection between the fourth antenna and the second communication circuit based on the second communication circuit operating in the scan mode;
releasing an electrical connection between the fifth antenna and the first communication circuit based on the first communication circuit operating in the scan mode;
performing a scan related to at least one of the first band or the second band through the first communication circuit electrically connected to the fourth antenna; and
performing a scan related to at least one of the second band or the third band through the second communication circuit electrically connected to the fifth antenna.

15. The method of claim 14, further comprising:
performing at least one of transmitting or receiving data through at least one of the fourth antenna or the fifth antenna based on the first communication circuit operating in the communication mode; or
performing at least one of transmitting or receiving data through at least one of the fourth antenna or the fifth antenna based on the second communication circuit operating in the communication mode.

16. The method of claim 11,
wherein the first band of the first band is configured to include a 2.4 GHz to 2.5 GHz band,
wherein the second band of the first band is configured to include a 5 GHz to 5.9 GHz band, and
wherein the third band is configured to include a 5.9 GHz to 7.2 GHz band.

17. An electronic device comprising:
memory storing instructions;
at least one first antenna supporting a first band, a second band and a third band of a wireless LAN communication method;

a first communication circuit supporting wireless LAN communication based on based on the first and the second band;
a second communication circuit supporting wireless LAN communication based on the second band and the third band; and
at least one processor, comprising processing circuitry, operatively connected to the first communication circuit and the second communication circuit,
wherein the instructions, when executed by the at least one processor, cause the electronic device to:
identify an operating mode of the first communication circuit and the second communication circuit;
release an electrical connection between at least one of the first communication circuit or the second communication circuit operating in a scan mode and the at least one first antenna based on at least one of the first communication circuit or the second communication circuit operating in the scan mode related to at least one of the second band or the third band; and
maintain an electrical connection between the at least one first antenna and the first communication circuit based on the first communication circuit operating in a scan mode related to the first band.

18. The electronic device of claim 17, wherein the instructions, when executed by the at least one processor, cause the electronic device to electrically connect the at least one first antenna to at least one the first communication circuit or the second communication circuit operating in a communication mode based on at least one of the first communication circuit or the second communication circuit operating in the communication mode.

19. The electronic device of claim 17, wherein the instructions, when executed by the at least one processor, cause the electronic device to release an electrical connection between the at least one first antenna and the second communication circuit based on the first communication circuit operating in a scan mode related to the first band.

20. The electronic device of claim 17,
wherein the first band of the first band is configured to include a 2.4 GHz to 2.5 GHz band,
wherein the second band of the first band is configured to include a 5 GHz to 5.9 GHz band, and
wherein the third band is configured to include a 5.9 GHZ to 7.2 GHz band.

* * * * *